(12) United States Patent
Franiak et al.

(10) Patent No.: US 11,142,111 B2
(45) Date of Patent: Oct. 12, 2021

(54) HOIST APPARATUS SECUREMENT SYSTEM AND METHOD

(71) Applicant: Wastequip, LLC, Charlotte, NC (US)

(72) Inventors: Nicholas Stephen Franiak, Waxhaw, NC (US); John Jason Downing, Winamac, IN (US); Steven J. Kopka, Winamac, IN (US); Matthew Mock, Peru, IN (US)

(73) Assignee: Wastequip LLC, Charlotte, NC (US)

( * ) Notice: Subject to any disclaimer, the term of this patent is extended or adjusted under 35 U.S.C. 154(b) by 28 days.

(21) Appl. No.: 16/369,502

(22) Filed: Mar. 29, 2019

(65) Prior Publication Data

US 2020/0307435 A1 Oct. 1, 2020

(51) Int. Cl.
| | |
|---|---|
| *B60P 1/00* | (2006.01) |
| *B62D 65/02* | (2006.01) |
| *B60P 1/64* | (2006.01) |

(52) U.S. Cl.
CPC .............. *B60P 1/00* (2013.01); *B60P 1/6427* (2013.01); *B62D 65/02* (2013.01)

(58) Field of Classification Search
CPC . B66C 23/44; B66C 23/42; B60P 1/00; B60P 1/6427; B62D 65/02
See application file for complete search history.

(56) References Cited

U.S. PATENT DOCUMENTS

| | | | | |
|---|---|---|---|---|
| 3,703,244 A | * | 11/1972 | Walsh | B62D 53/067 414/500 |
| 3,829,064 A | * | 8/1974 | Jackson | B66D 1/28 254/323 |
| 4,212,581 A | * | 7/1980 | Pierce | B60P 1/00 193/37 |
| 5,088,875 A | | 2/1992 | Galbreath et al. | |
| 5,211,526 A | * | 5/1993 | Robinette | B60P 1/5471 212/238 |
| 5,531,559 A | | 7/1996 | Kruzick | |
| 5,542,807 A | | 8/1996 | Kruzick | |
| 5,617,963 A | * | 4/1997 | Baziuk | B66C 23/208 212/179 |
| 5,725,112 A | * | 3/1998 | Thorby | B66C 23/44 212/180 |
| 5,791,858 A | * | 8/1998 | Sasser | A22B 5/161 414/462 |

(Continued)

Primary Examiner — Michael E Gallion
(74) Attorney, Agent, or Firm — Nelson Mullins Riley & Scarborough LLP

(57) ABSTRACT

A hoist apparatus assembly for a vehicle having a vehicle frame. The hoist apparatus assembly includes a hoist apparatus comprising a hoist apparatus frame. The hoist apparatus frame has a first end, a second end opposite the first end, and a longitudinal axis. The hoist apparatus assembly also includes an apron plate disposed at the hoist apparatus frame first end, and the apron plate defines at least one slot therethrough. Also, the hoist apparatus assembly includes at least one first bracket including a plate and a stem disposed at a right angle to the plate. The plate of the at least one first bracket is coupled with the hoist apparatus frame at the hoist apparatus frame first end. The stem of the at least one first bracket extends through the at least one slot in the apron plate and is coupled with the vehicle frame.

25 Claims, 20 Drawing Sheets

(56) References Cited

U.S. PATENT DOCUMENTS

| | | | | |
|---|---|---|---|---|
| 5,800,117 | A * | 9/1998 | Milton | B66C 23/48 |
| | | | | 254/4 R |
| 5,876,019 | A * | 3/1999 | Morrissey, Jr. | B60D 1/38 |
| | | | | 254/323 |
| 6,059,214 | A * | 5/2000 | Rashidi | B60P 3/224 |
| | | | | 137/355.12 |
| 6,138,991 | A * | 10/2000 | Myers, Jr. | B66C 23/44 |
| | | | | 212/180 |
| 6,695,553 | B1 | 2/2004 | Galbreath et al. | |
| 7,017,887 | B1 * | 3/2006 | Verakis | B66D 1/12 |
| | | | | 254/342 |
| 8,157,499 | B1 * | 4/2012 | Jones | B60P 1/027 |
| | | | | 414/549 |
| 8,851,823 | B1 * | 10/2014 | Hallmon, Jr. | B66C 23/44 |
| | | | | 414/540 |
| 9,004,842 | B2 | 4/2015 | Downing et al. | |
| 9,896,013 | B2 | 2/2018 | Franiak et al. | |
| 9,963,329 | B1 * | 5/2018 | Guess, Jr. | B66C 23/44 |
| 10,137,819 | B2 * | 11/2018 | Franiak | B60P 1/6454 |
| 10,377,292 | B2 | 8/2019 | Downing et al. | |
| 2005/0260062 | A1 * | 11/2005 | Boasso | B60P 1/6427 |
| | | | | 414/332 |
| 2011/0272653 | A1 * | 11/2011 | Cilliers | B66D 1/14 |
| | | | | 254/334 |
| 2015/0329335 | A1 * | 11/2015 | Azzarelli | B66D 1/12 |
| | | | | 254/323 |
| 2016/0068090 | A1 * | 3/2016 | Kibler | B60P 1/6454 |
| | | | | 298/14 |

* cited by examiner

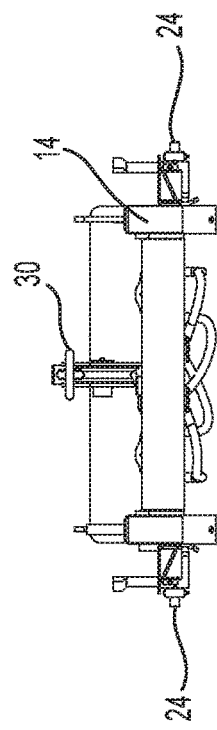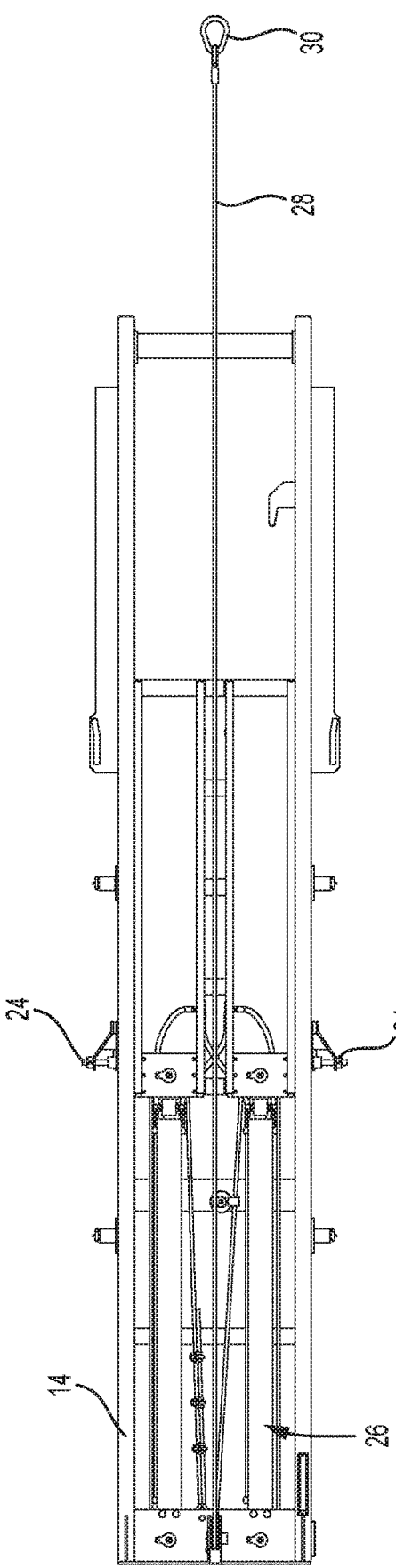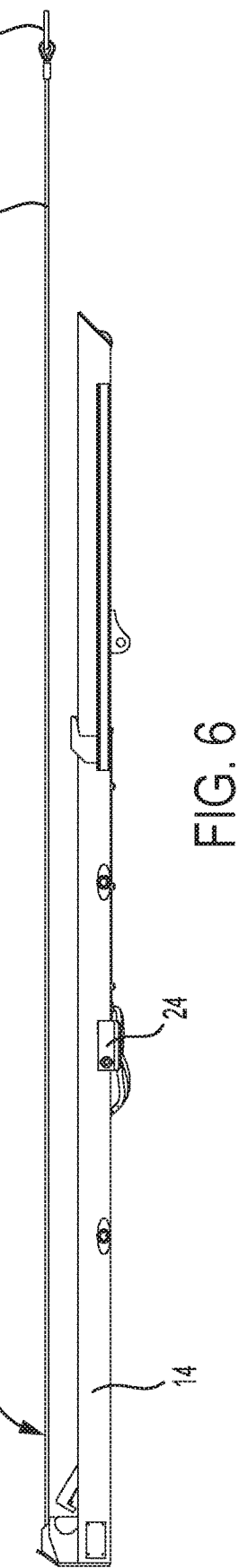
FIG. 4
FIG. 5
FIG. 6

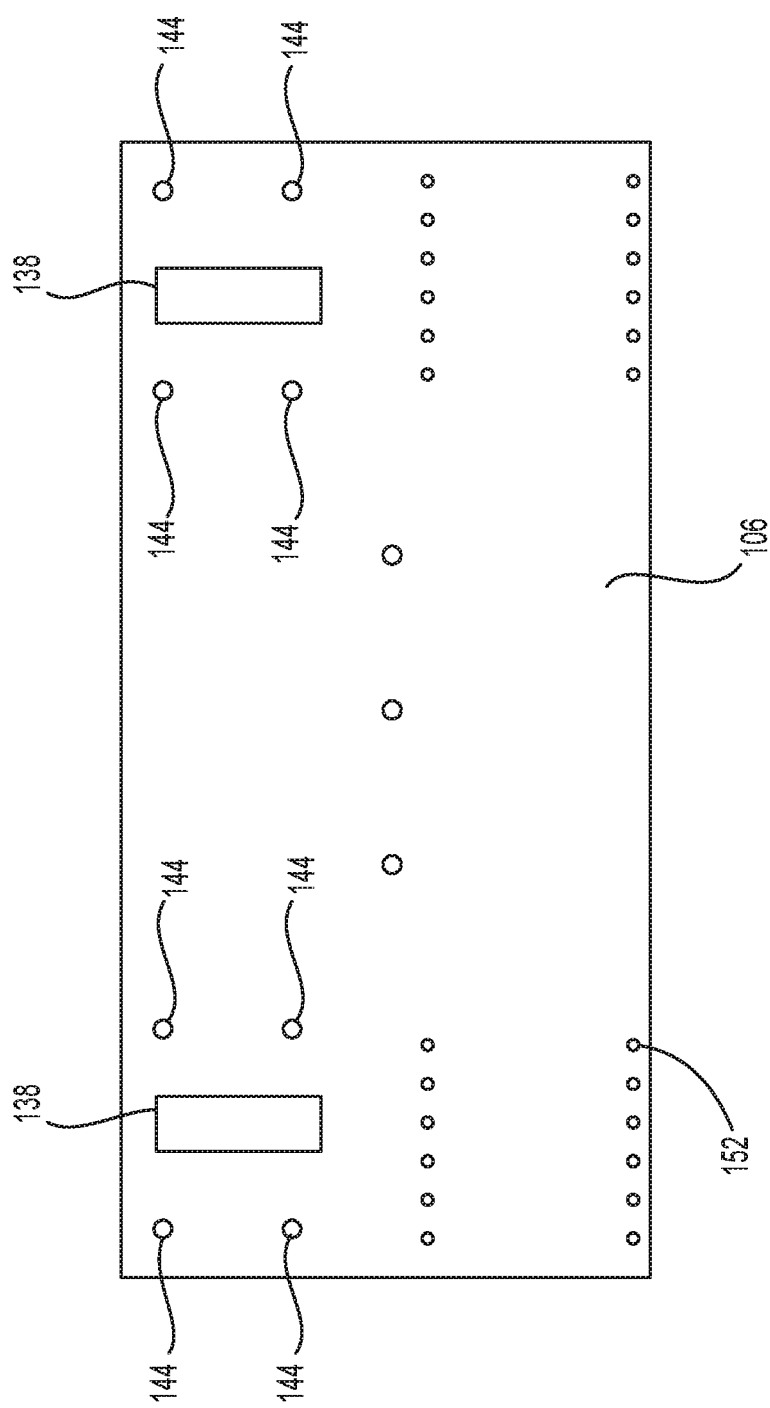

HOIST APPARATUS SECUREMENT SYSTEM AND METHOD

TECHNICAL FIELD

Embodiments of the present invention generally relate to the field of material-hauling containers and vehicles comprising a hoist apparatus operative to load, unload, transport, and empty such containers. More particularly, certain embodiments of the present invention relate to improved systems and methods for securing a hoist apparatus to a vehicle frame.

BACKGROUND

In the waste and materials hauling industry, a variety of containers are used to collect, transport, and/or dump waste, bulk, and liquid materials, among others. Such containers typically are carried on vehicles, such as trucks, or on trailers. The vehicle or trailer is provided with a hoist apparatus to load a container onto and unload the container from the vehicle or trailer, transport the container, and empty the container. Examples of hoist apparatuses include hook hoists, cable hoists, winches, forklifts, and container handlers. As is well-understood, the hoist apparatus may be operated via one or more hydraulic cylinders in fluid communication with the vehicle's hydraulic system.

The containers loaded and carried by hoist apparatuses may be very heavy, especially when filled. Accordingly, and for example, hoist apparatuses may be rated for a container capacity of 20,000 or 30,000 lbs. Heavier duty hoist apparatuses can be rated for more than 30,000 lbs, in some cases up to 75,000 lbs or greater.

The process of securing currently available hoist apparatuses to a frame or chassis of a vehicle or trailer is cumbersome and complex. Among other things, this process typically involves making cuts to the frame and welding the hoist apparatus (or a sub-frame thereof) to the vehicle or trailer frame. Further, shims and/or other components may be required to help position the hoist apparatus on or align it properly with the vehicle or trailer frame. Finally, painting (or repainting) of the vehicle or trailer frame and/or hoist assembly often is necessary as a result of the cuts, welds, and other abrasions from installation.

The foregoing discussion is intended only to illustrate various aspects of the related art in the field of the invention at the time, and should not be taken as a disavowal of claim scope.

SUMMARY

Some example embodiments comprise apparatus and methods for attaching a hoist apparatus to a vehicle frame. In various embodiments, the hoist apparatus may comprise a hook hoist, a cable hoist, or a loaded container handler. Also, in various embodiments, the vehicle may comprise a trailer. Further, in various embodiments, the hoist apparatus is attached to the vehicle frame only via a non-welded connection, such as via mechanical fasteners.

According to one embodiment, the present invention provides a hoist apparatus assembly for a vehicle, the vehicle having a vehicle frame comprising first and second longitudinal rails. The hoist apparatus assembly includes a hoist apparatus mechanically fastened to and detachable from the vehicle frame, and the hoist apparatus includes a hoist apparatus frame. The hoist apparatus assembly also includes at least one first bracket. The at least one first bracket has a plate extending along a first plane and a stem coupled with the plate, the stem extending along a second plane that is perpendicular to the first plane. The plate of the at least one first bracket is mechanically fastened to the hoist apparatus frame. The stem of the at least one first bracket is mechanically fastened to the first longitudinal rail of the vehicle frame.

In yet another embodiment, the present invention provides a hoist apparatus assembly for a vehicle having a vehicle frame. The hoist apparatus assembly includes a hoist apparatus comprising a hoist apparatus frame. The hoist apparatus frame has a first end, a second end opposite the first end, and a longitudinal axis. The hoist apparatus assembly also includes an apron plate disposed at the hoist apparatus frame first end, and the apron plate defines at least one slot therethrough. Also, the hoist apparatus assembly includes at least one first bracket including a plate and a stem disposed at a right angle to the plate. The plate of the at least one first bracket is coupled with the hoist apparatus frame at the hoist apparatus frame first end. The stem of the at least one first bracket extends through the at least one slot in the apron plate and is coupled with the vehicle frame.

According to a further embodiment, the present invention provides a method for attaching a hoist apparatus to a vehicle frame. The hoist apparatus includes a hoist apparatus frame and the vehicle frame includes first and second longitudinal rails. The vehicle frame has a proximal end, a distal end, and a first longitudinal axis, and the hoist apparatus has a second longitudinal axis. The method includes the step of placing the hoist apparatus frame on the first and second longitudinal rails such that the first longitudinal axis is parallel with the second longitudinal axis. The method also includes positioning an apron plate at the distal end of the vehicle frame. Further, the method includes providing at least one first bracket having a plate and a stem disposed at a right angle to the plate. The method additionally includes positioning the stem of the at least one first bracket so that it is in engagement with the first longitudinal rail. The stem of the at least one first bracket extends along a plane parallel with the first longitudinal axis. The method includes positioning the plate of the at least one first bracket so that it engages the hoist apparatus frame, mechanically fastening the stem of the at least one first bracket with the first longitudinal rail, and mechanically fastening the plate of the at least one first bracket with the hoist apparatus frame.

BRIEF DESCRIPTION OF THE DRAWINGS

Figure 1:
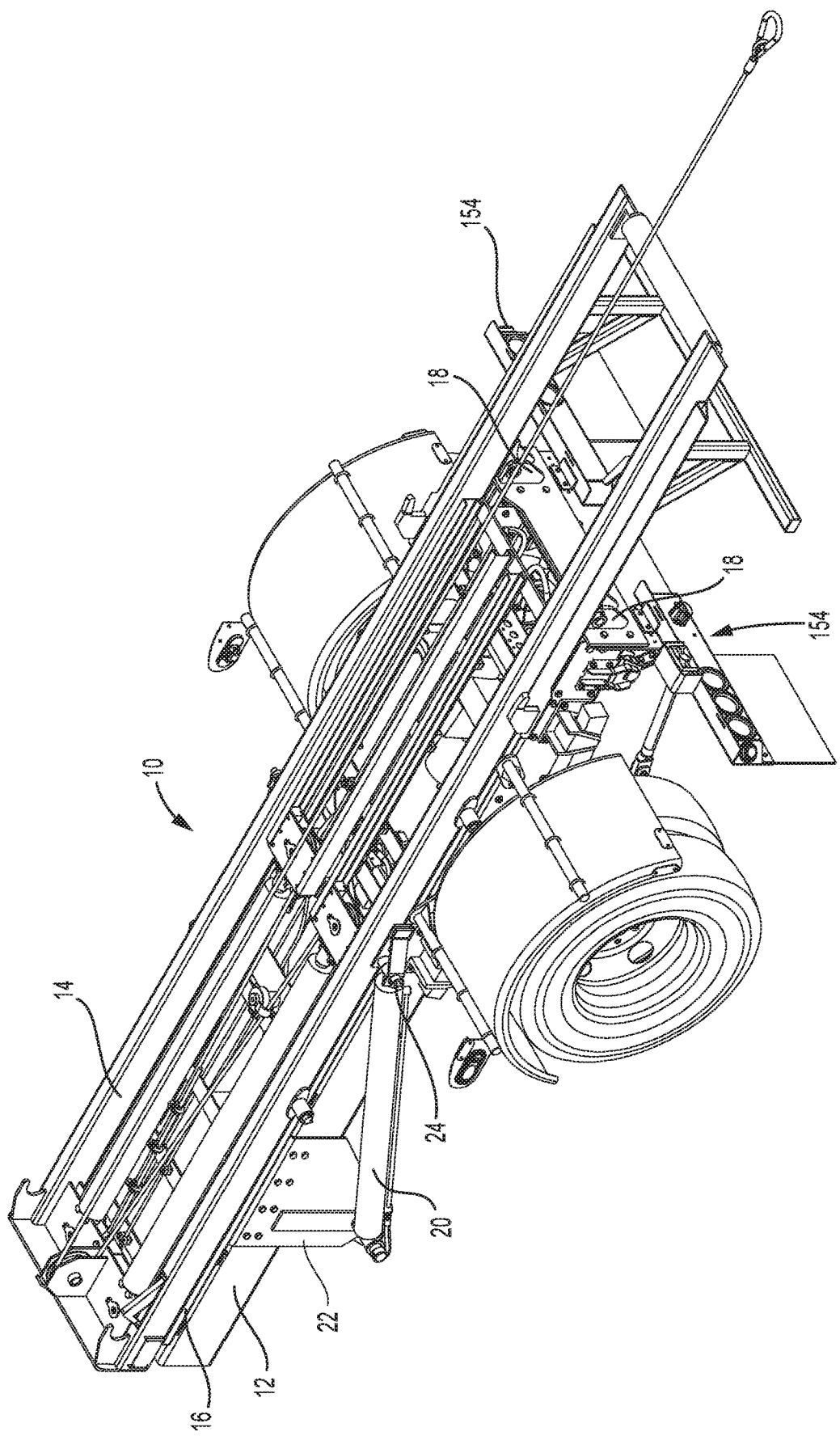
Figure 2:
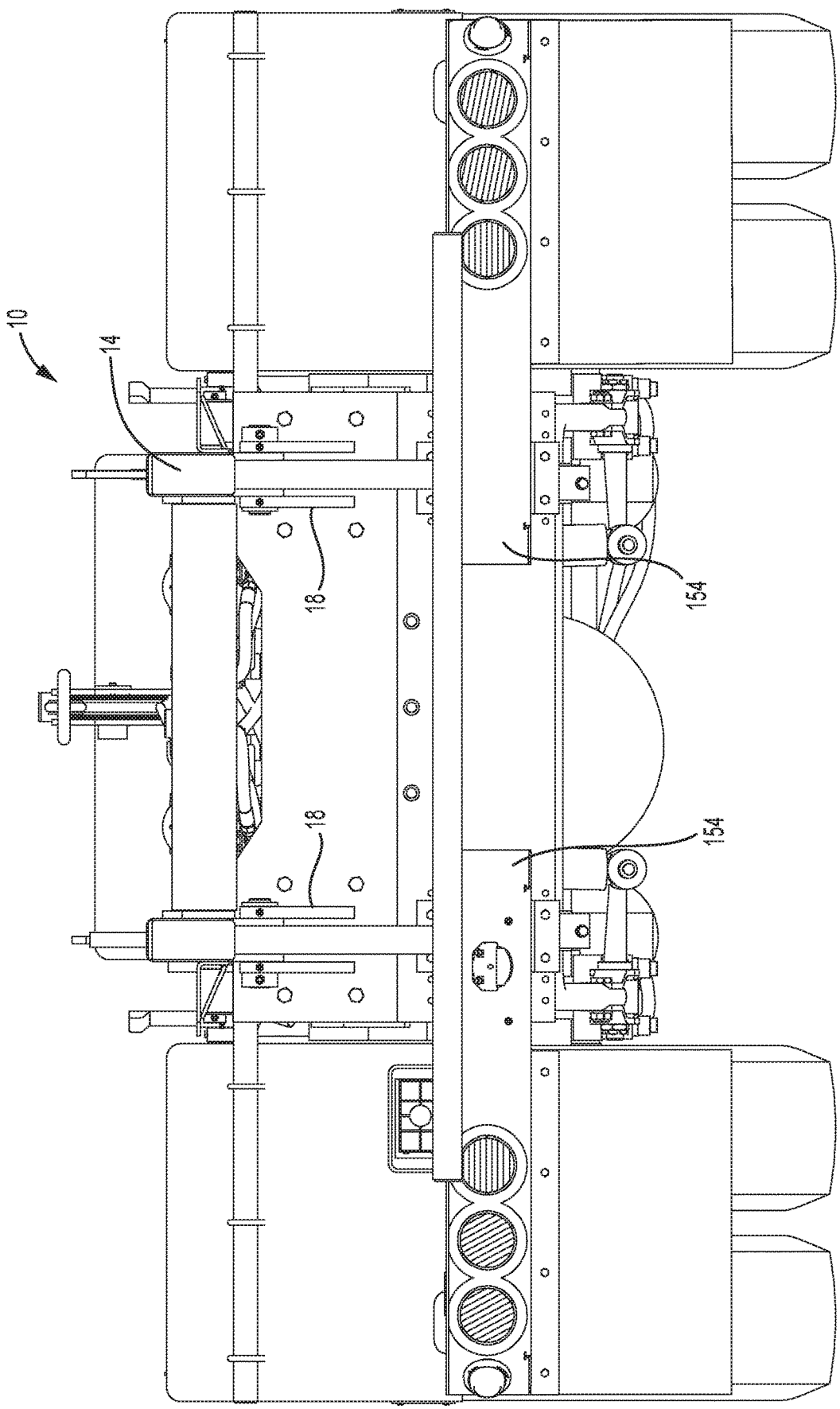
Figure 3:
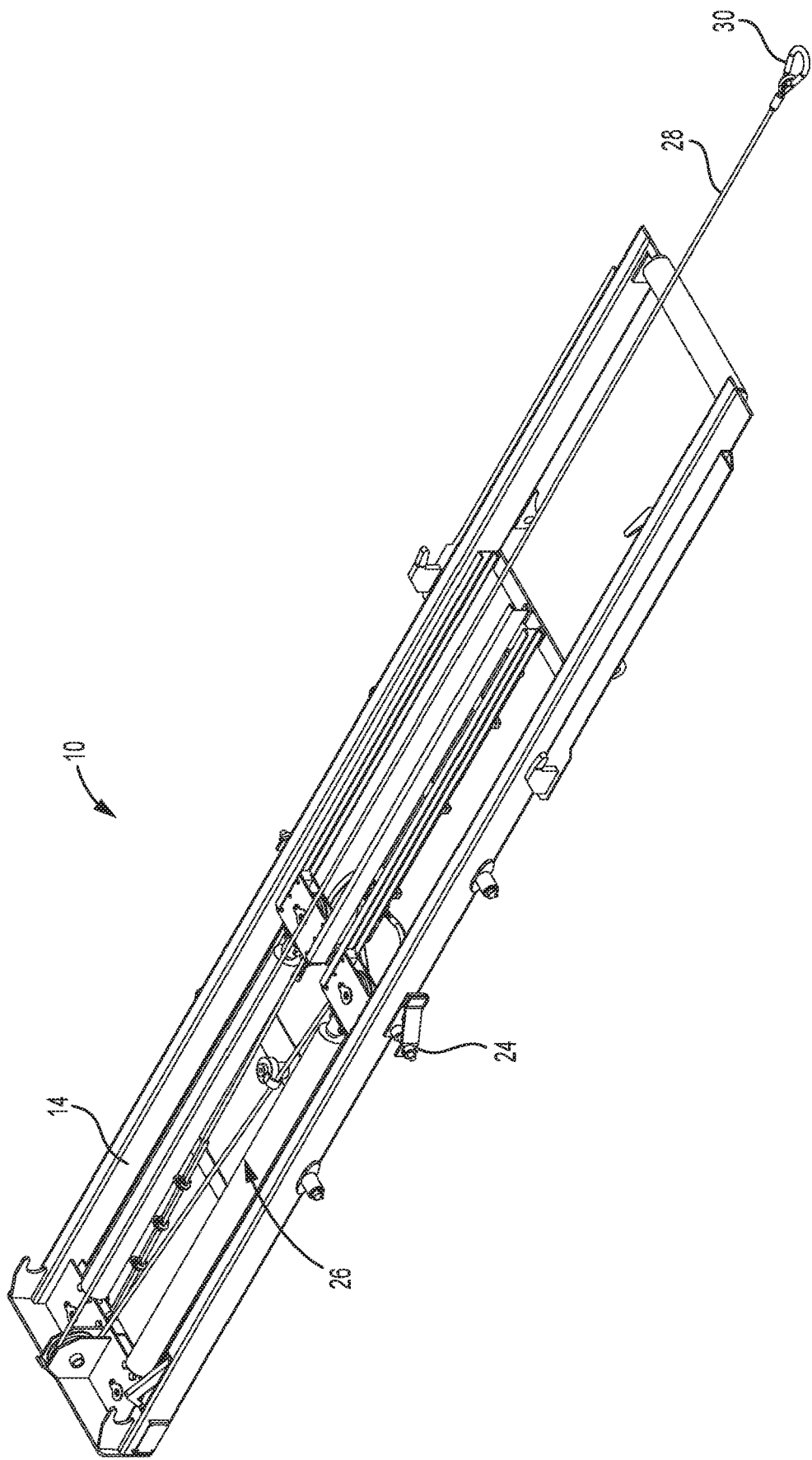

Having thus described some example embodiments in general terms, reference will now be made to the accompanying drawings, which are not necessarily drawn to scale, and wherein:

FIG. 1 is a perspective view of a hoist apparatus coupled with a frame according to an embodiment of the present invention;

FIG. 2 is a rear elevation view of the hoist apparatus and frame of FIG. 1;

FIG. 3 is a perspective view of the hoist apparatus of FIG. 1 shown without a corresponding sub-frame or the frame of FIG. 1.

Figure 7:
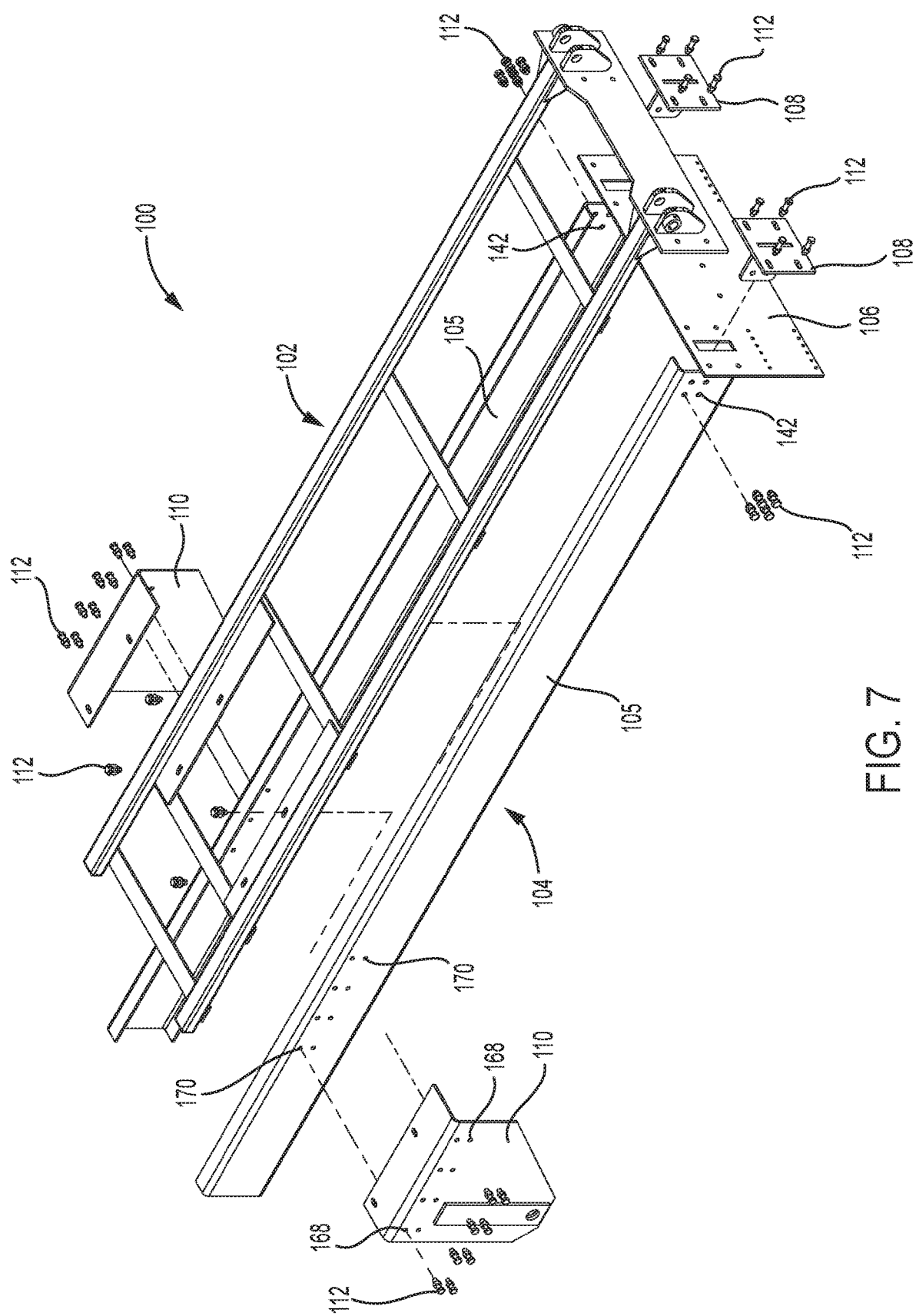
Figure 8:
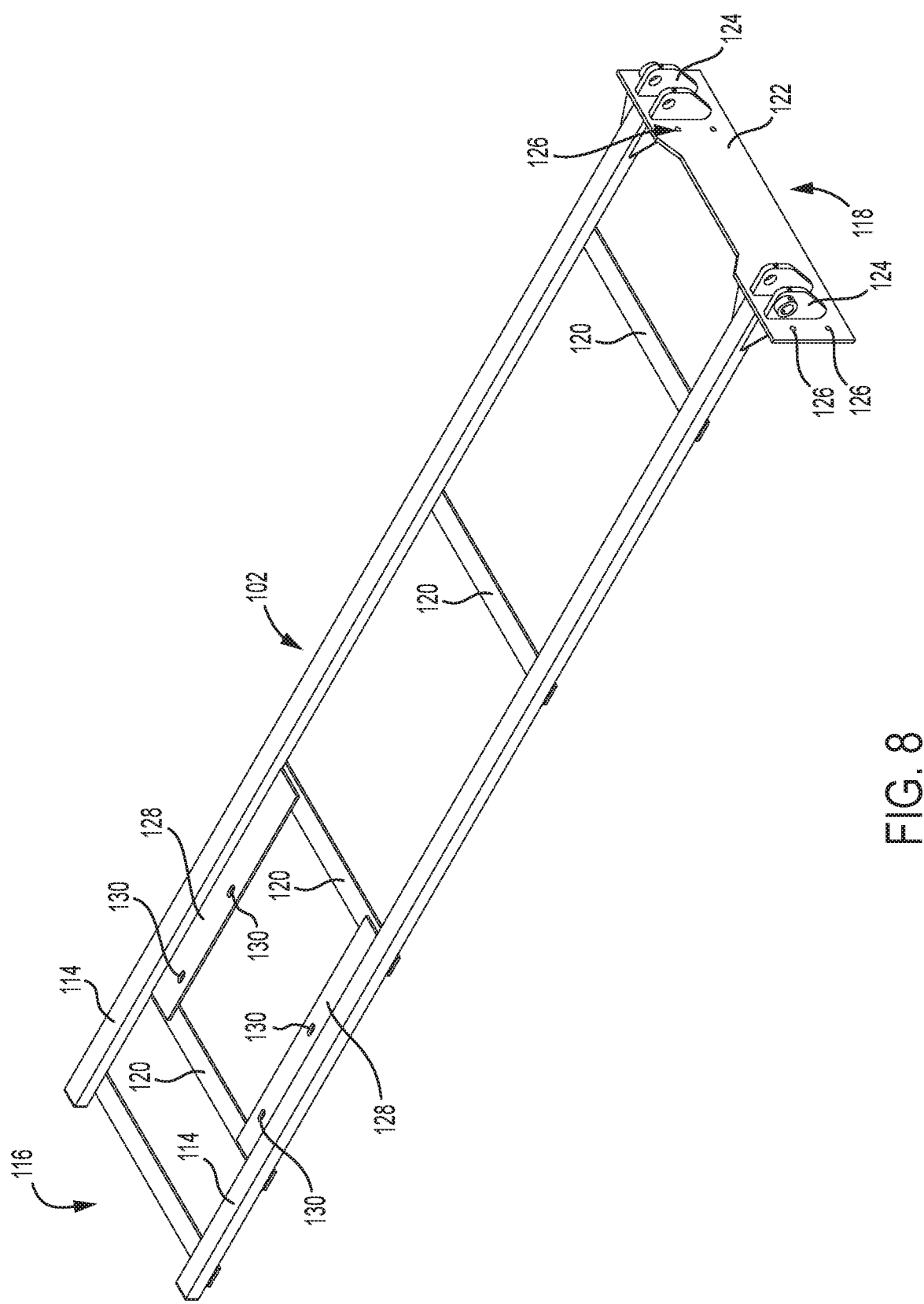
Figure 9:
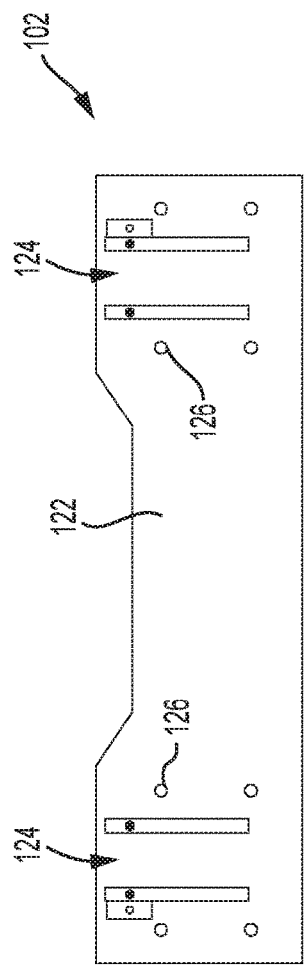
Figure 10:
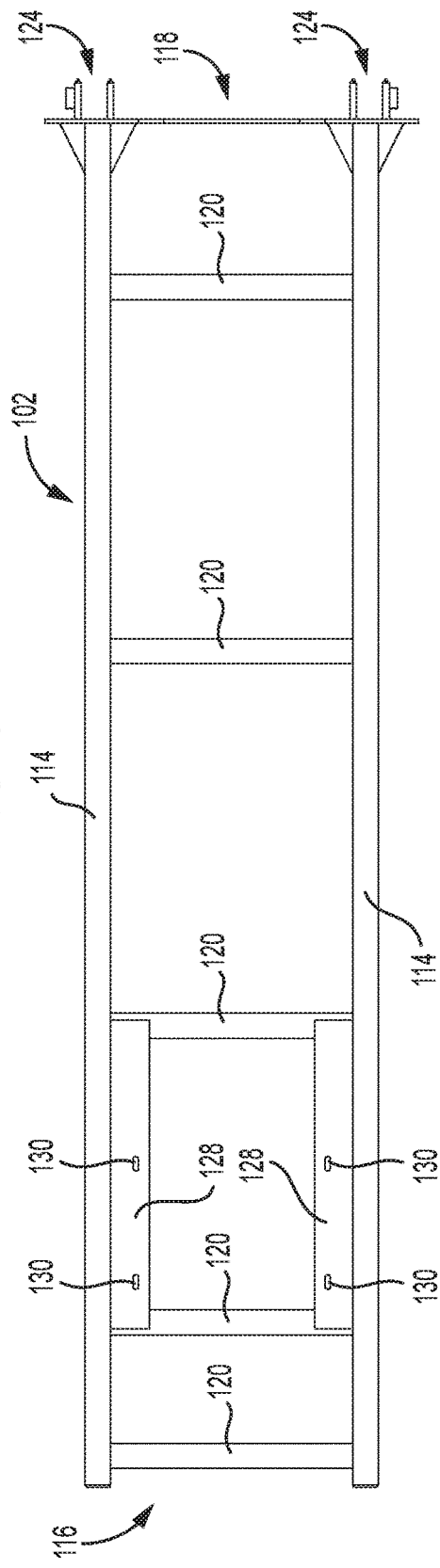
Figure 11:
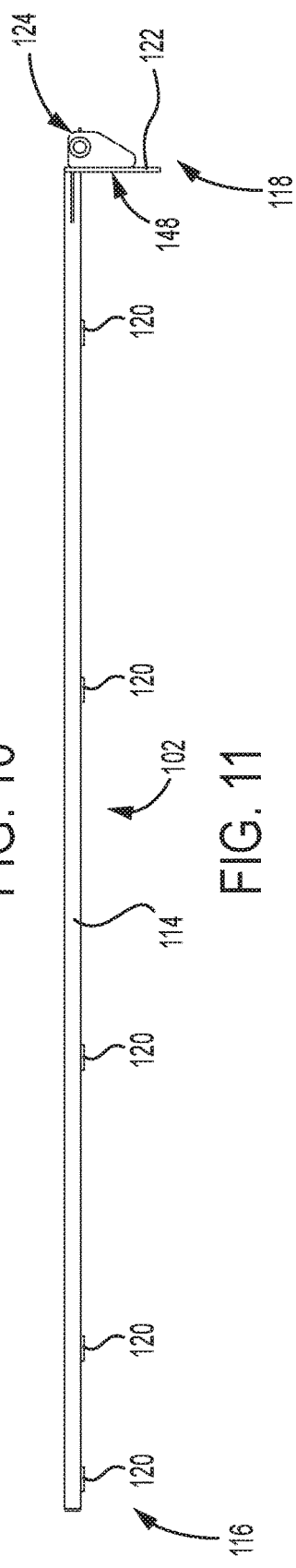
Figure 16:
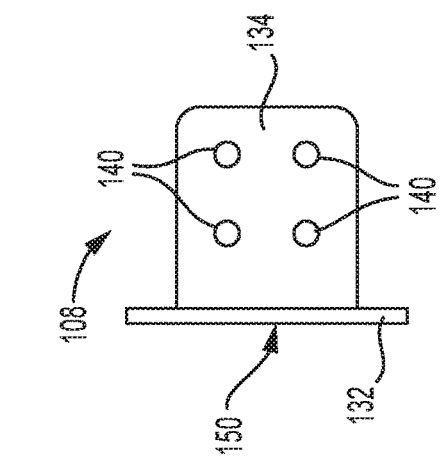
Figure 13:
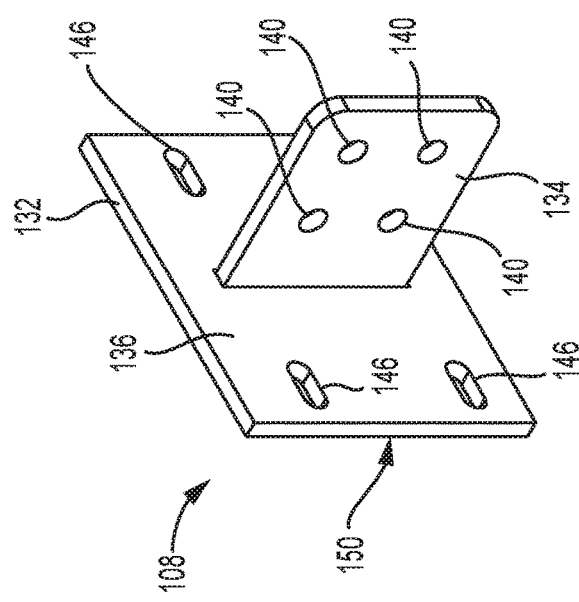
Figure 15:
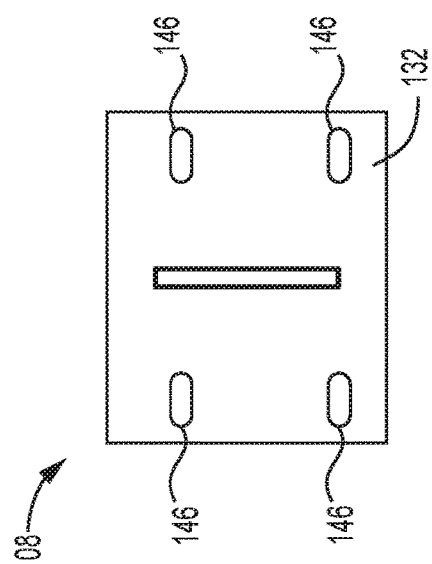
Figure 14:
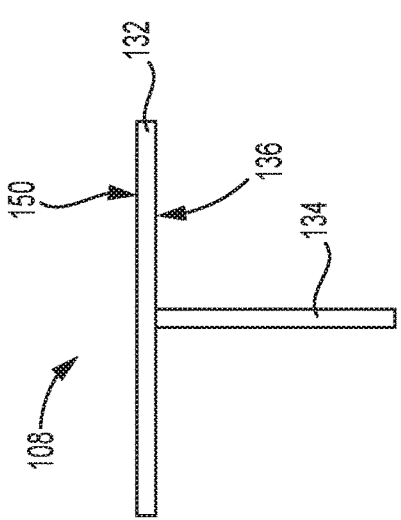
Figure 17:
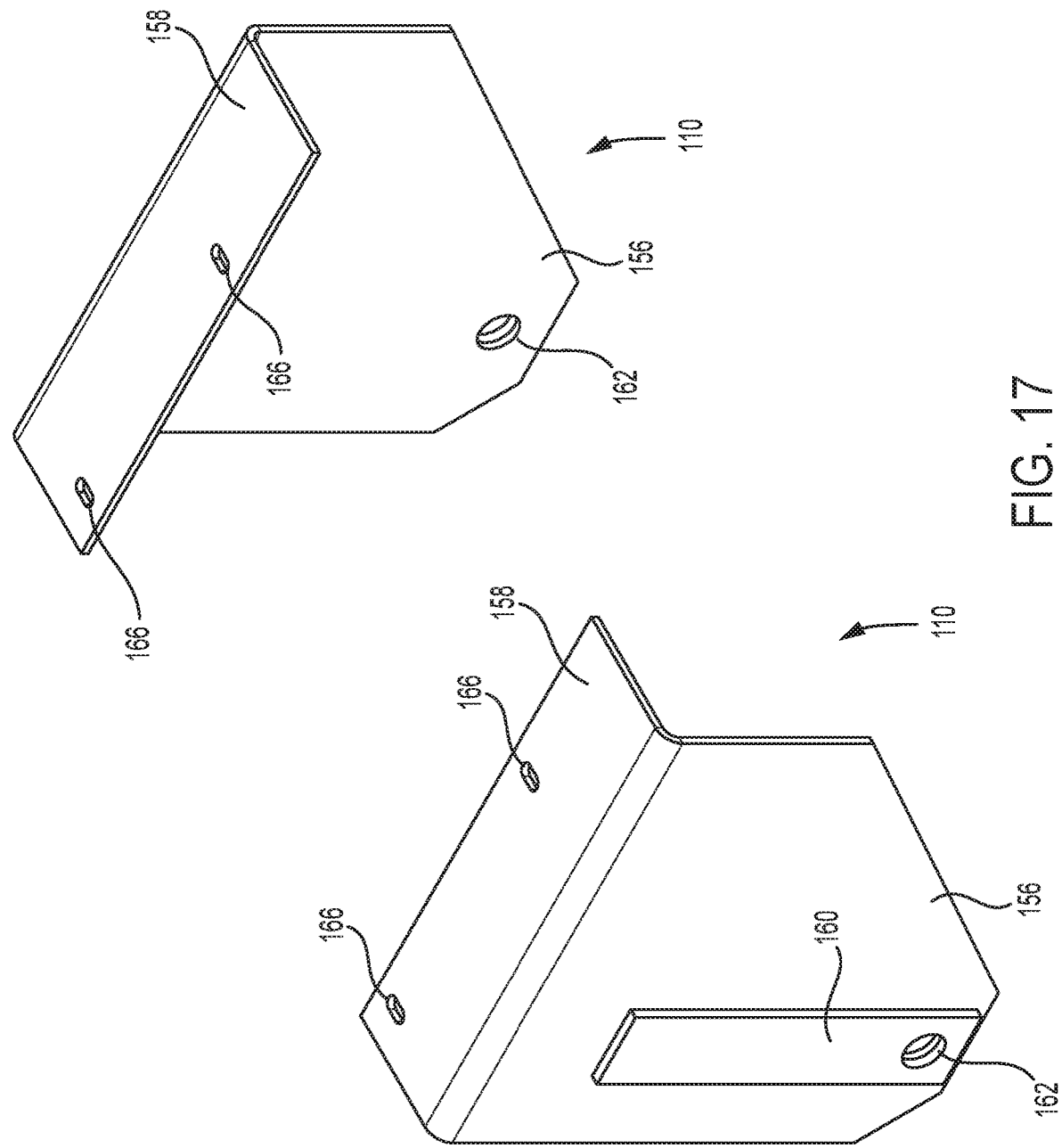

FIGS. 4-6 are respective rear elevation, plan, and side elevation views of the hoist apparatus of FIG. 3;

FIG. 7 is an exploded perspective view of a system for securing a hoist apparatus sub-frame to a frame in accordance with an embodiment of the present invention;

FIG. 8 is a perspective view of the hoist apparatus sub-frame of FIG. 7;

FIGS. 9-11 are respective rear elevation, plan, and side elevation views of the hoist apparatus sub-frame of FIG. 7;

FIG. 12 is an elevation view of the apron plate of FIG. 7;

FIG. 13 is a perspective view of one of the first brackets of FIG. 7;

FIGS. 14-16 are respective plan, front elevation, and side elevation views of one of the first brackets of FIG. 7;

FIG. 17 is a perspective view of the second brackets of FIG. 7.

Figure 19:
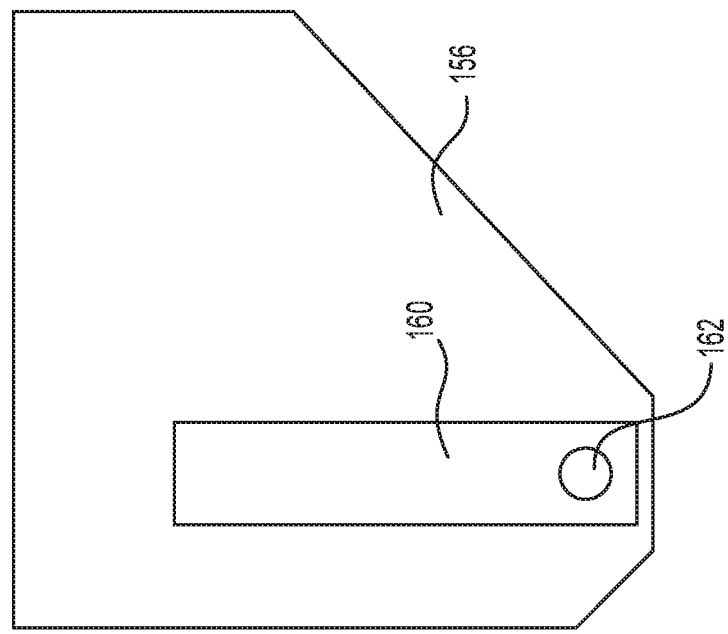
Figure 18:
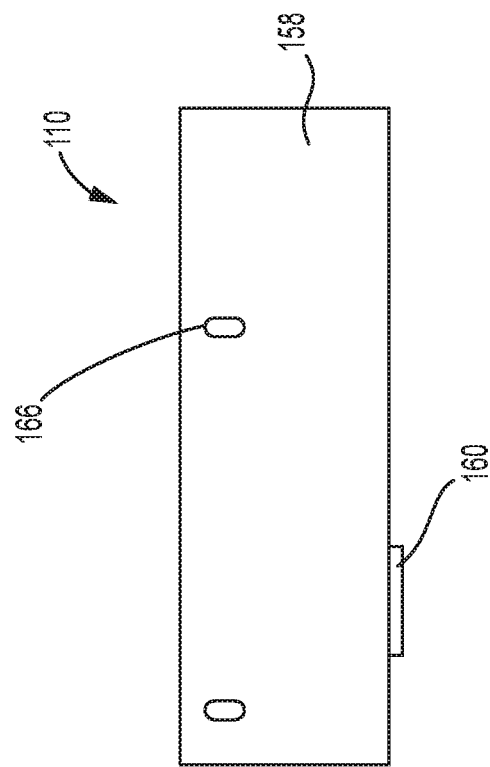
Figure 20:
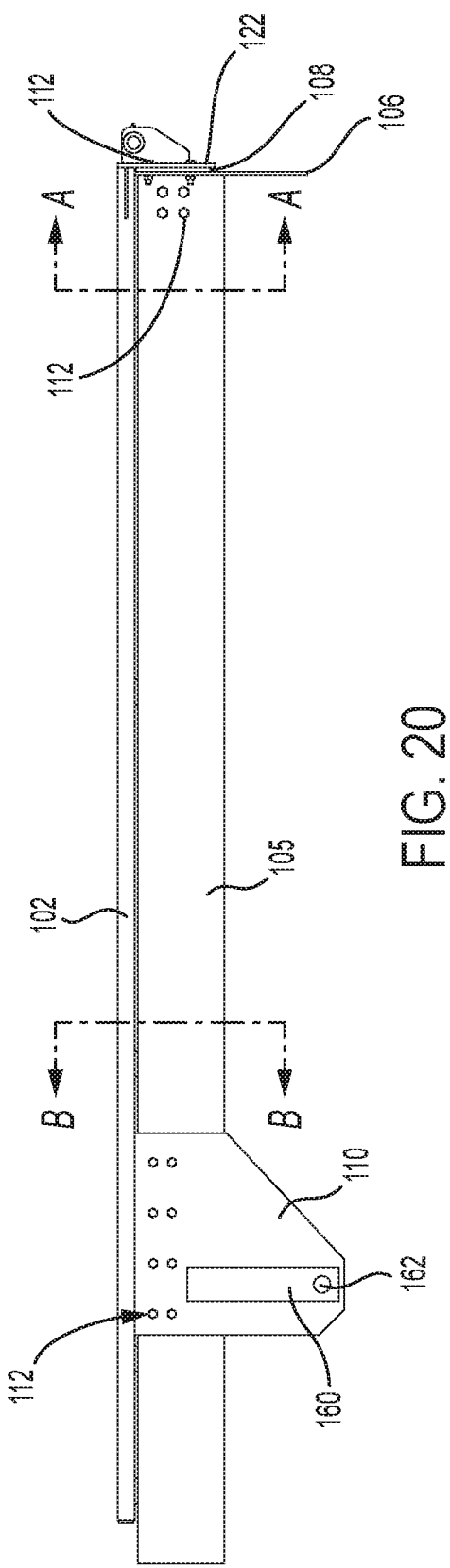
Figure 21:
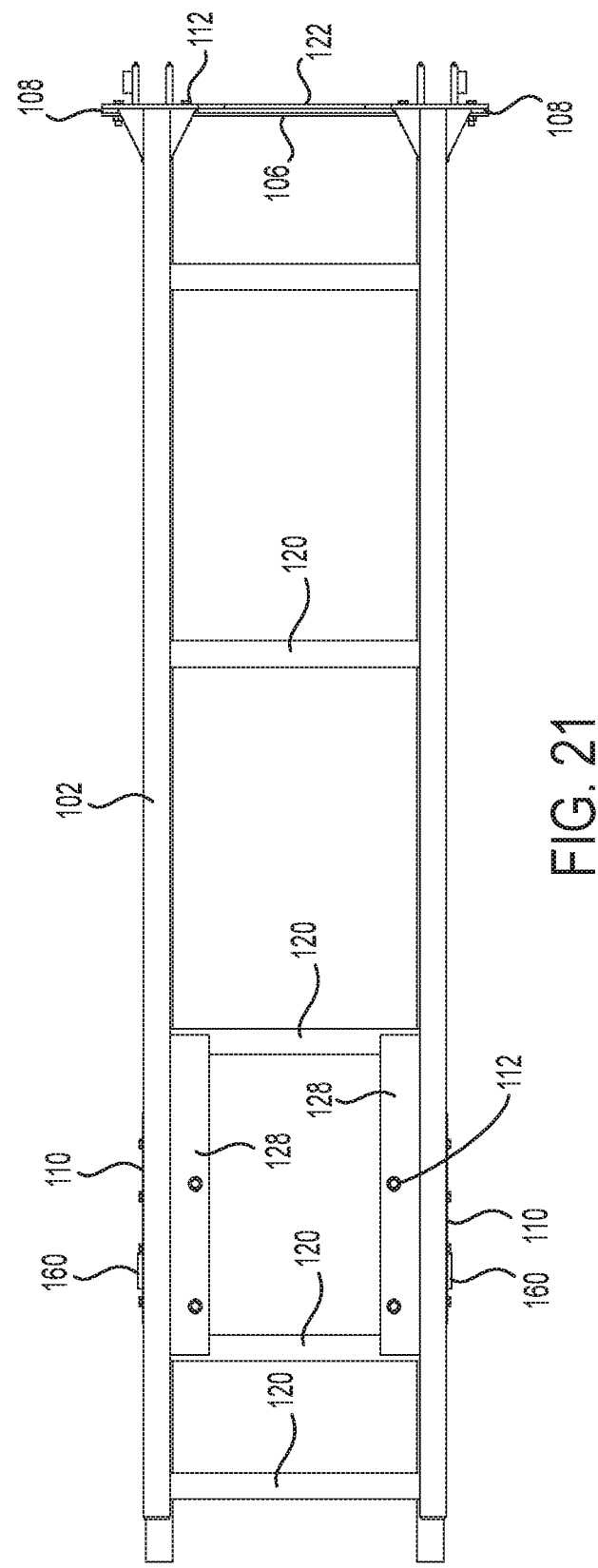
Figure 22:
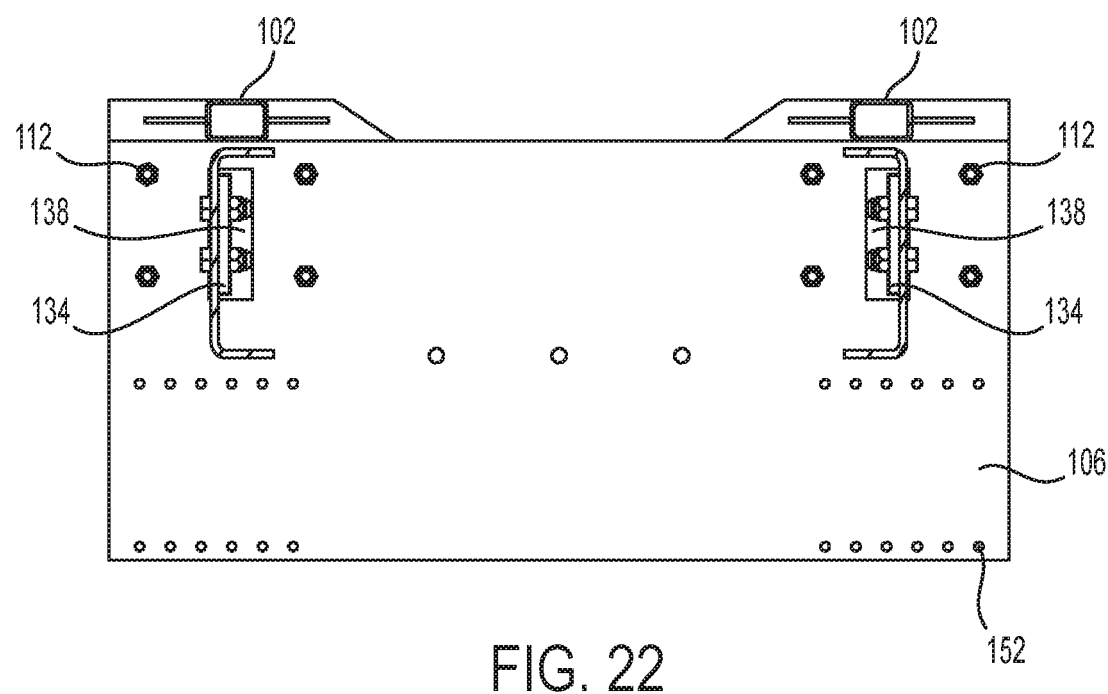
Figure 23:
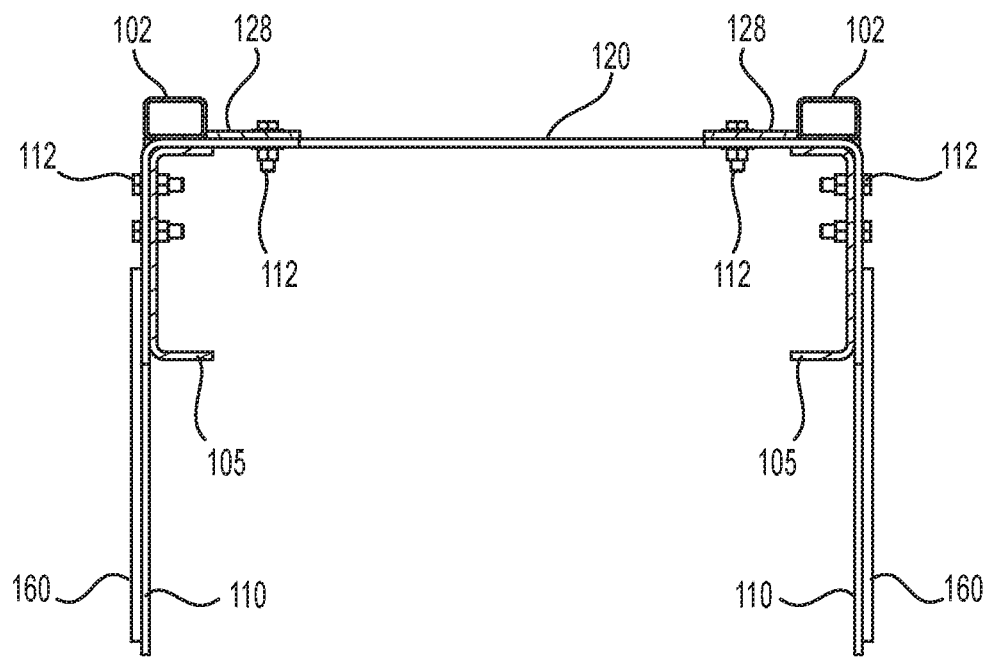
Figure 24:
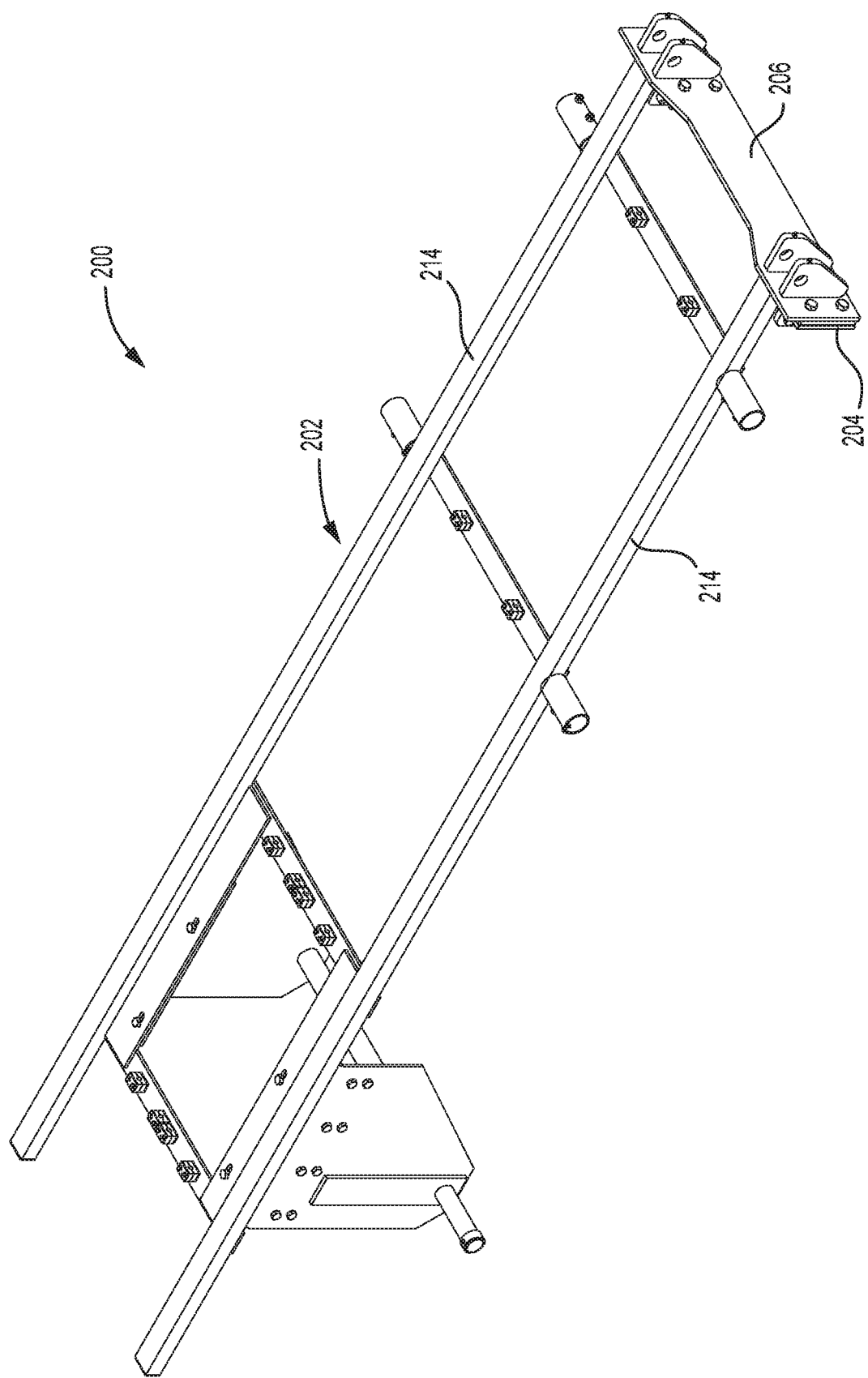
Figure 25:
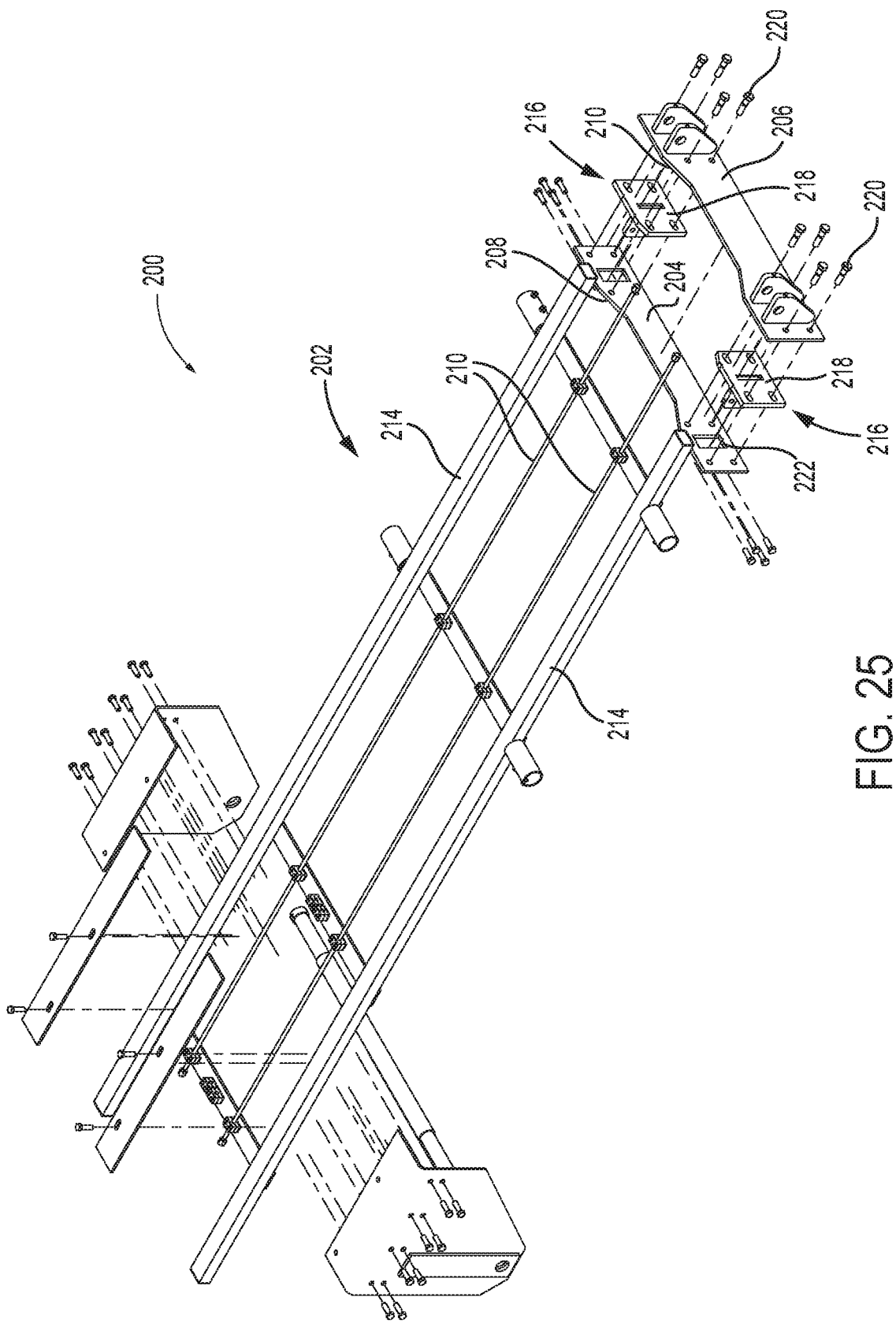
Figure 26:
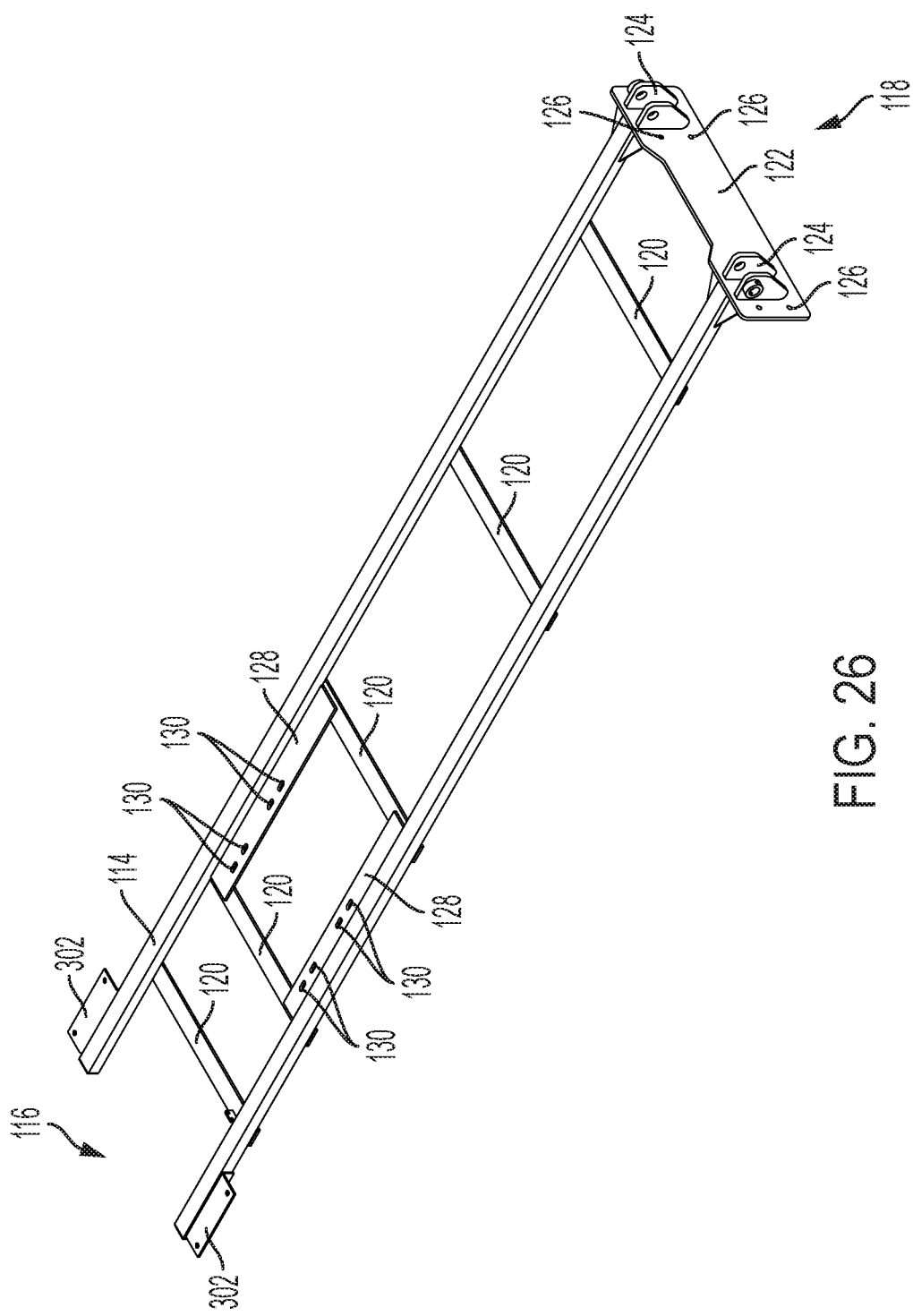
Figure 28:
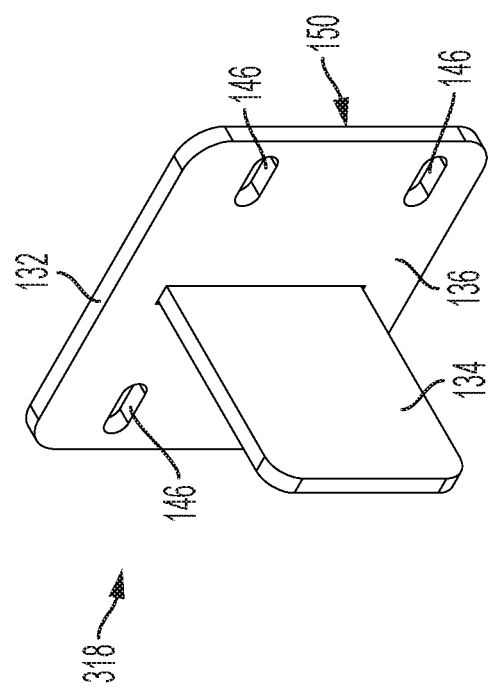
Figure 27:
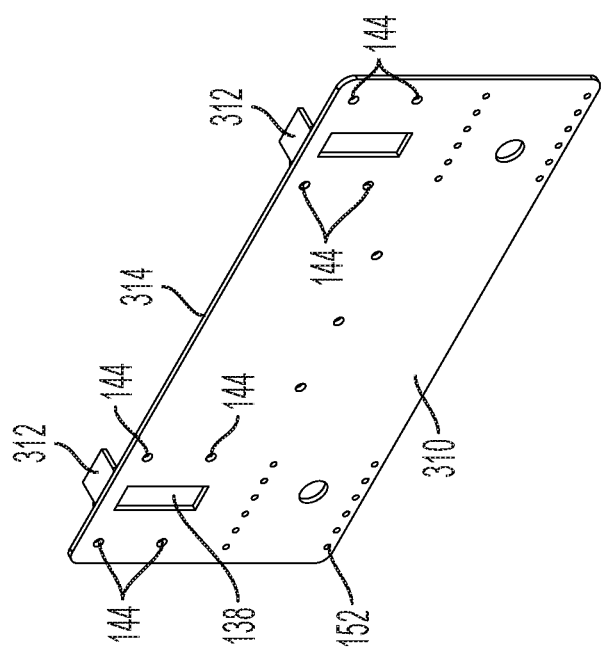
Figure 29:
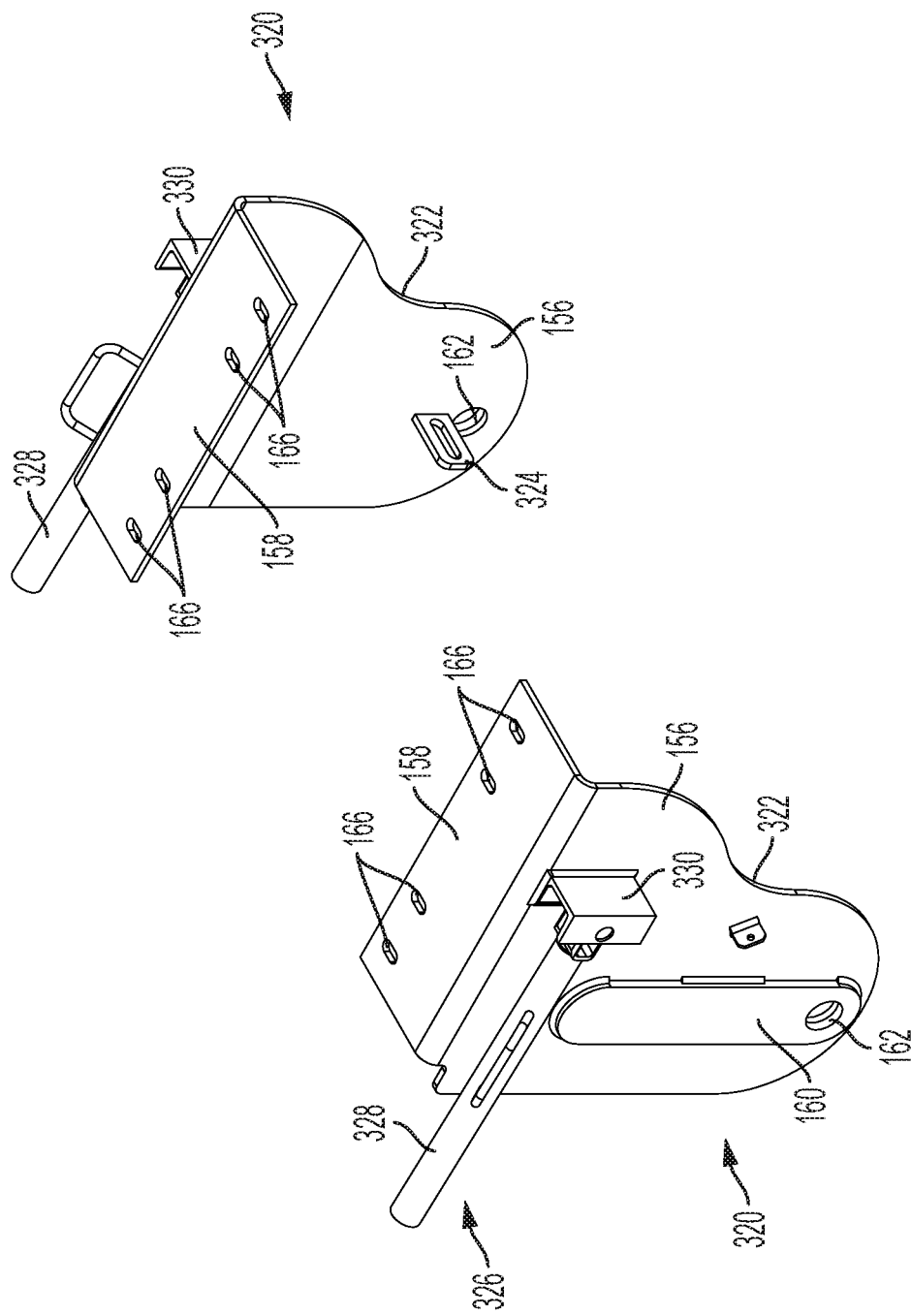
Figure 30:
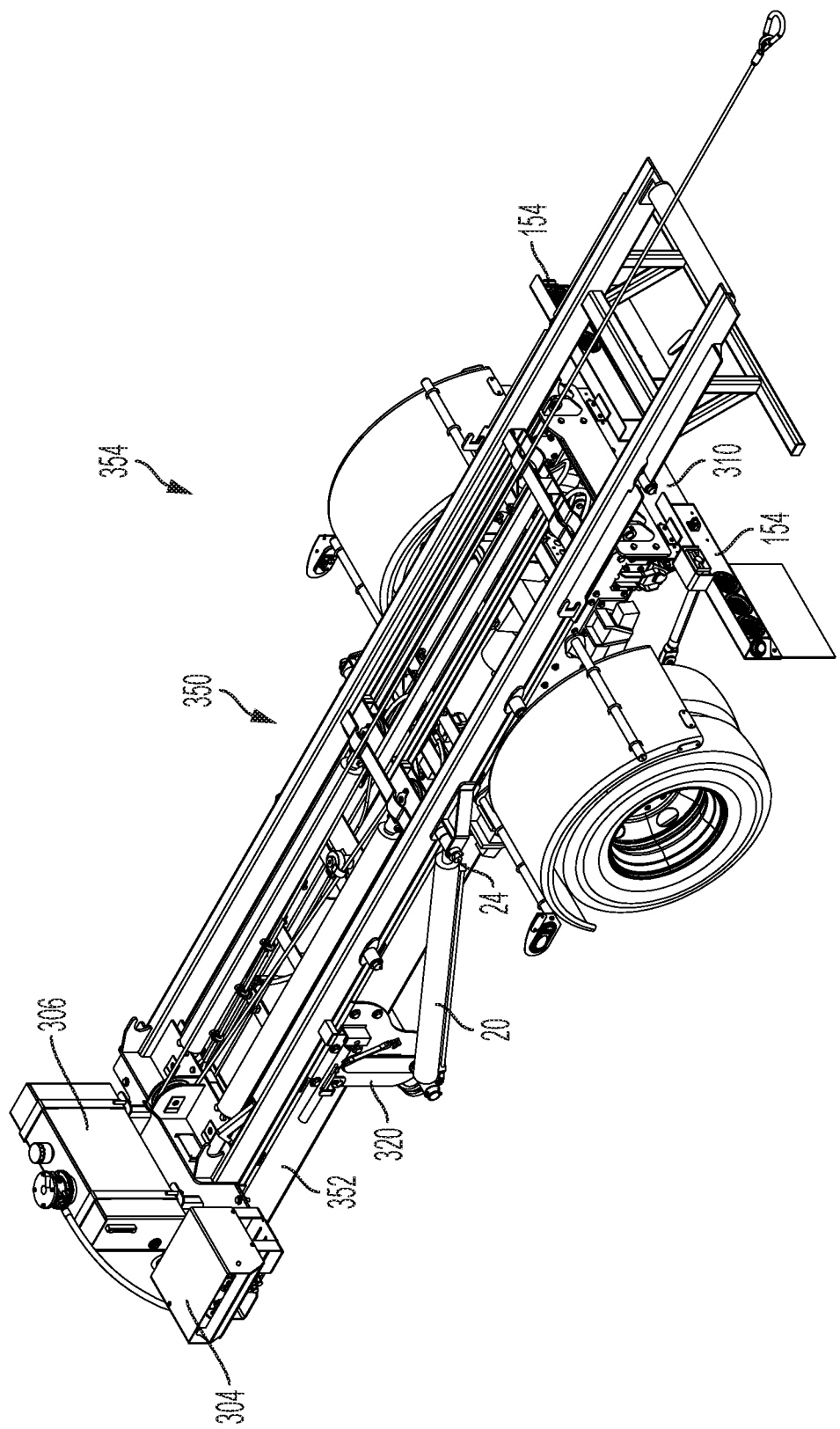
Figure 31:
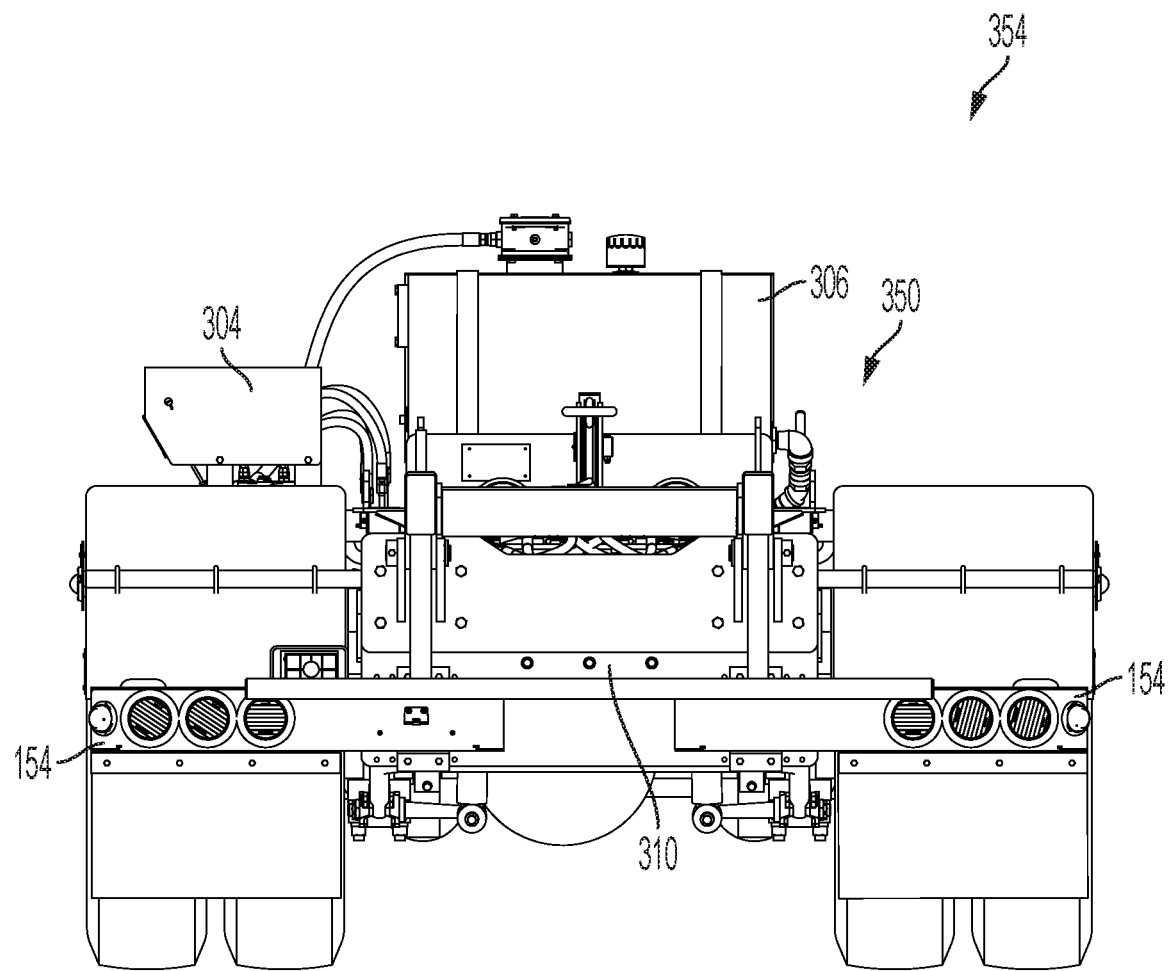

FIGS. 18-19 are respective plan and side elevation views of one of the second brackets of FIG. 7;

FIGS. 20-21 are respective side elevation and plan views of the hoist apparatus sub-frame coupled with the frame of FIG. 7;

FIG. 22 is a cross-sectional view taken along the line A-A in FIG. 20;

FIG. 23 is a cross-sectional view taken along the line B-B in FIG. 20;

FIG. 24 is a perspective view of a system for securing a hoist apparatus sub-frame to a frame in accordance with another embodiment of the present invention;

FIG. 25 is an exploded perspective view of the system of FIG. 24;

FIG. 26 is a perspective view of a hoist apparatus sub-frame according to another embodiment of the present invention;

FIG. 27 is a perspective view of an apron assembly in accordance with another embodiment of the present invention;

FIG. 28 is a perspective view of a first bracket in accordance with another embodiment of the present invention;

FIG. 29 is a perspective view of second brackets in accordance with another embodiment of the present invention; and FIGS. 30-31 are perspective and rear elevation views of a hoist apparatus coupled with a frame according to another embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a vehicle or hoist apparatus, such as but not limited to "vertical," "horizontal," "upper," "lower," "front," or "rear," refer to directions and relative positions with respect to the vehicle's or hoist apparatus's orientation in its normal intended operation, as indicated in the Figures herein. Thus, for instance, the terms "vertical" and "upper" refer to the vertical direction and relative upper position in the perspectives of the Figures and should be understood in that context, even with respect to an apparatus that may be disposed in a different orientation. The term "substantially," as used herein, should be interpreted as "nearly" or "close to," such as to account for design and manufacturing tolerances of the apparatus.

Hoist apparatuses are currently available from a number of companies, such as Galbreath, LLC of Winamac, Ind. Examples of hoist apparatuses which may be modified for use with embodiments of the present invention may be found, for example, in U.S. Pat. No. 10,137,819 to Franiak et al.; U.S. Pat. No. 9,896,013 to Franiak et al.; U.S. Pat. No. 9,004,842 to Downing et al.; U.S. Pat. No. 5,542,807 to Kruzick; U.S. Pat. No. 5,531,559 to Kruzick; and U.S. Pat. No. 5,088,875 to Galbreath et al., each of which is incorporated by reference herein in its entirety for all purposes. Those of skill in the art are familiar with such hoist apparatuses, which accordingly are not described in further detail herein.

Such hoist apparatuses are often sold as components or kits separate from the vehicles to which they are ultimately attached. Typically, these hoist apparatuses are not designed to fit the frame of a single specific vehicle (or a particular manufacturer's vehicles). Rather, they are designed to be attached to a variety of different vehicles, many of which have dimensions and specifications that vary from model to model and manufacturer to manufacturer. For instance, the frame of a first manufacturer's vehicle may have a certain width, and a second manufacturer's vehicle frame may have a meaningfully different width. Likewise, the length of the first manufacturer's vehicle frame may exceed the length of the second manufacturer's vehicle frame.

As a result, attaching currently available lift systems to the vehicle chassis or frame is a difficult and time-consuming process. Typically, installation will require that cuts be made to the vehicle frame. Further, at least some welding is often required to secure the lift system (or a sub-frame thereof) to the vehicle frame. Various other components and tools may be required, such as shims that help position the hoist apparatus on or align it properly with the vehicle frame. Finally, following installation, the vehicle frame and hoist assembly may need to be painted or repainted prior to delivery to a customer.

Accordingly, embodiments of the present invention relate to improved systems and methods for attaching a hoist apparatus to a vehicle frame. As described in more detail below, when installing a hoist apparatus in accordance with embodiments of the present invention, neither cutting of a vehicle chassis nor welding is required. Likewise, it is not necessary to use additional fitting components, such as shims or the like, to allow a hoist apparatus to be used with differently-sized vehicle frames. A hoist apparatus may be appropriately secured to vehicle frames of differing dimensions using only suitable fasteners, such as but not limited to bolts, and the components described herein. Further, systems in accordance with embodiments of the present invention may be sold and/or shipped to customers fully painted, and the systems can then be installed without requiring repainting or touch-up.

Although some preferred embodiments are discussed below in the context of a vehicle-mounted cable hoist comprising a sub-frame, those of skill in the art will appreciate that the present invention is not so limited. In particular, it is contemplated that embodiments of the present invention may be used with hoist apparatuses other than cable hoists, such as but not limited to hook hoists, bail hook hoists, winches, forklifts, and container handlers. Further, embodiments of the present invention may be used with hoist apparatuses that do not comprise a sub-frame, but rather which are intended to be secured directly to a vehicle frame. Likewise, embodiments of the invention also may be used with hoist apparatuses on vehicles other than trucks, or on hoist mechanisms that are not mounted on vehicles at all, such as trailers. Accordingly, as used herein, the term "vehicle" encompasses not just trucks, but any vehicle suitable for use with a hoist apparatus, including but not limited to trailers.

Turning now to the figures, FIG. 1 is a perspective view of a hoist apparatus 10 coupled with a frame, or chassis, 12 of a vehicle according to an embodiment of the present invention, and FIG. 2 is a rear elevation view of hoist apparatus 10 coupled with frame 12. For the sake of clarity, the vehicle is only partially illustrated in FIGS. 1-2.

As shown, hoist apparatus 10 is a cable hoist comprising a main frame 14 pivotably connected with a sub-frame 16. As described in more detail below, sub-frame 16 is mounted to frame 12. Main frame 14 is pivotably mounted to sub-frame 16 by pivotal mounts 18. In the illustrated embodiment, hoist apparatus 10 is actuated via a pair of linear actuators 20, such as hydraulic cylinders, which are pivotably mounted at one end to brackets 22 coupled with frame 12 and sub-frame 16, and at the other end to main frame 14 via pivotal mounts 24. As is well-understood, linear actuators 20 serve to elevate main frame 14 from a lowered, generally horizontal transporting position to a raised, inclined position used for the loading, unloading, and/or dumping of containers.

Referring now also to FIGS. 3-6, in which hoist apparatus 10 is shown without sub-frame 16 or frame 14, hoist apparatus 10 in this embodiment further includes a cable winch system 26 which includes a cable 28. Cable 28 of winch system 26 may be connected to a container, whereupon winch system 26 operates to draw the container up onto main frame 14 of hoist apparatus 10 during the loading of the container and to ease the container down the main frame 14 of hoist apparatus 10 during unloading of the container. Cable 28 may include a container attachment element 30 for attaching cable 28 to a container.

Certain details regarding systems and methods for coupling a hoist apparatus with a frame in accordance with embodiments of the present invention are provided with reference to FIGS. 7-25. In this regard, FIG. 7 is an exploded perspective view of a securement system 100 in accordance with an embodiment of the present invention. Securement system 100 enables a hoist apparatus sub-frame 102 to be mounted on a frame 104. Frame 104 may be a vehicle frame, trailer frame, or the like in various embodiments and comprise a pair of frame rails 105. Frame rails 105, which define a support surface adapted to receive and support a container or other item that is rolled or slid onto main frame 104, are elongate beams having a "u" shaped cross-section, though frame rails 105 may have a variety of additional shapes in other embodiments. Likewise, in some embodiments, sub-frame 102 may not be provided, and instead a main frame of a hoist apparatus may be used. In various embodiments, it is contemplated that system 100 may be sold as a kit or after-market assembly, though it is also contemplated that system 100 could be sold with a vehicle.

In this embodiment, securement system 100 comprises an apron plate 106, a pair of first brackets 108, and a pair of second brackets 110. As described in more detail below, suitable fasteners 112 may be used with securement system 100 to mount a hoist apparatus on frame 104 without cutting frame 104 or welding hoist apparatus sub-frame 102 to frame 104. Those of skill in the art will appreciate that not all of these components may be included in all embodiments, and in some embodiments these components may be arranged differently with respect to each other than the arrangement shown in FIG. 7.

FIG. 8 is a perspective view of hoist apparatus sub-frame 102, and FIGS. 9-11 are respective rear elevation, plan, and side elevation views of hoist apparatus sub-frame 102. Sub-frame 102 in this embodiment comprises a pair of rails 114 extending longitudinally between a front end 116 that, when the hoist apparatus is installed, is proximate the front of a vehicle (e.g., a vehicle cab or a trailer hitch) and a rear end 118 that, when the hoist apparatus is installed, is proximate the rear of the vehicle. Rails 114 are formed of a suitable metal material, such as steel, and in some cases may be formed of hollow rectangular tubing. Rails 114 preferably are generally parallel with one another and spaced apart by a plurality of support members 120 that extend generally perpendicularly to rails 114 and that may be welded in place, for example on the bottom side of rails 114, or otherwise suitably attached to rails 114. Support members 120 in this embodiment comprise an elongate, generally flat metal strip, but any suitable support member may be used in other embodiments.

Also, hoist apparatus sub-frame 102 comprises an end plate 122 coupled between rails 114 at second end 118. End plate 122 extends generally vertically along a plane orthogonal to the horizontal plane in which rails 114 lie in this embodiment. Further, pairs of flanges 124 coupled with and projecting orthogonally from end plate 122 may define attachment points for the main-frame of the hoist apparatus, and about which the main-frame may pivot relative to sub-frame 102 in this embodiment. A plurality of apertures 126 are preferably defined in end plate 122 to facilitate attachment of sub-frame 102 with frame 104, as described in more detail below. For instance, eight such apertures 126 may be defined in end plate 122, with four such apertures 126 spaced evenly about the attachment point of each rail 114 with end plate 122.

Finally, hoist apparatus sub-frame 102 in this embodiment comprises a pair of support members 128 that extend generally parallel with rails 114. As shown, support members 128 each extend between two support members 120 and are disposed adjacent to a respective rail 114. Support members 128 may be welded in place or otherwise suitably attached to support members 120 and/or rails 114. Again, in this embodiment support members 128 comprise an elongate, generally flat metal strip, but any suitable support member may be used in other embodiments. Support members 128 preferably define one or more slots 130 therein to facilitate attachment of sub-frame 102 to frame 104. For instance, two such slots 130 are shown defined in each support member 128 in this embodiment. As described in more detail below, slots 130 may be elongated in a direction parallel the longitudinal axis of rails 114. As a result, fasteners 112 may be moved to various different positions along the length thereof, as needed, depending on the dimensions of frame 104 and/or the dimensions and shape of frame rails 105.

FIG. 12 is an elevation view of apron plate 106. Apron plate 106, where provided, may provide strength and support to the hoist apparatus on frame 104, for example as a main frame of the hoist apparatus moves relative to sub-frame 102. Apron plate 106 may also provide a mounting structure for peripheral electronics associated with the hoist assembly. More particularly, apron plate 106 preferably comprises a generally flat plate, which may be rectangular in shape in some embodiments, formed from a suitable metal material. In one embodiment, apron plate 106 may be formed from A36 steel. Apron plate 106 may also have a shape other than rectangular in other embodiments. For instance, apron plate 106 could be oval-shaped or "u"-shaped in some embodiments. When system 100 is assembled, apron plate 106 may be disposed against the ends of frame rails 105 (FIG. 7) proximate the rear of the vehicle. Apron plate 106 may thus extend generally vertically in a plane perpendicular to a horizontal plane along which frame rails 105 lie in this embodiment. However, apron plate 106 need not be welded to frame 104 or sub-frame 102.

Rather, with further reference to FIGS. 13-16, in one preferred embodiment, apron plate 106 is preferably configured to be held in place against frame rails 105 by first brackets 108, which are described below, and by end plate 122 of sub-frame 102. In this regard, first brackets 108 may be generally "T" shaped when viewed in plan and comprise a plate 132 from which a stem 134 projects. Stem 134 may be centered on an inner face 136 of plate 132 and may extend therefrom along a perpendicular plane, though this need not be the case in all embodiments. Those of skill in the art will appreciate that various dimensions of brackets 108 and the size, grade, and/or type of fasteners 112 used may vary in embodiments of the invention, for example depending on the intended load capacity of the associated hoist apparatus and its intended application (including the truck used, the type of hoist apparatus, etc.). In one embodiment, stem 134 of brackets 108 may be about ½"×4"×5¼", and plate 132 of brackets 108 may be about ½"×10½"×8", and both may be formed of A36 steel. Apron plate 106 preferably defines corresponding slots 138 that receive stems 134 therethrough. The height dimension of slots 138 preferably is about the same as or slightly greater than the height of stems 134, but the width dimension of slots 138 preferably is greater than the width of stems 134. As described in more detail herein, this permits stems 134 to be moved to various positions along the width of slots 138, as needed, depending on the width of frame 104 and/or the dimensions and shape of frame rails 105.

In one embodiment, one or more apertures 140 preferably are defined in stems 134 of first brackets 108. Apertures 140 may be used to secure stems 134 (and thus, brackets 108) to frame rails 105 of frame 104. In particular, and for example, frame rails 105 may have a plurality of corresponding apertures 142 either pre-defined and/or formed therein during installation. In one embodiment, and given that the specifications and dimensions of frame 104 may vary, apertures 142 may be drilled into (or otherwise defined in) frame rails 105 to be in alignment with apertures 140 once first brackets 108 and apron plate 106 have been aligned with respect to frame 104. Suitable fasteners 112 may then be inserted into apertures 142, 140 to secure apron plate 106 and brackets 108 to frame 104.

In alternative embodiment, stems 134 of first brackets 108 may be provided without pre-defined apertures 140 and thus may initially be "blank." During installation, first brackets 108 are coupled with apron plate 106 and/or end plate 122 and, as described herein, stems 134 may be aligned with and disposed against frame rails 105. Apertures 140, 142 may then be defined (e.g., drilled or the like) at substantially the same time, and fasteners 112 may then be installed.

Additionally, in one embodiment, apron plate 106 may define a plurality of apertures 144 for receiving suitable fasteners. For example, four such apertures 144 are spaced about each of slots 138 in the embodiment shown in FIG. 12, though other suitable arrangements are contemplated. Likewise, in brackets 108, a plurality of slots 146 may be defined in plate 132. Preferably, the apertures 144 and slots 146 are equal in number to the apertures 126 defined in end plate 122 of sub-frame 102. Further, apertures 126 and 144 and slots 146 preferably are all in alignment when a frame-facing face 148 of end plate 122 (FIG. 11) is in engagement with an outer face 150 of plate 132 of each bracket 108 and apron plate 106 is in engagement with inner face 136 of each bracket 108. Thus, a fastener 112 may pass through each "set" of aligned apertures 126, 144, and slots 146, and sub-frame 102 may then be secured to brackets 108, apron plate 106, and frame 104.

In various embodiments, fasteners 112 may be bolts. Among many possibilities, suitable bolts may include hex bolts, huck bolts, carriage bolts, and shoulder bolts. In one embodiment, fasteners 112 may comprise ⅝"×2" Grade 5 hex head bolts. Nonetheless, those of skill in the art will appreciate that fasteners other than bolts may be suitable in various embodiments. Also as noted above, those of skill in the art will appreciate that the type and grade of fasteners 112 used may vary in various applications and for various intended load capacities of the hoist apparatus. For higher load capacities, the diameter of fasteners 112 may be increased and the number of fasteners 112 used may increase.

Also, as best seen in FIGS. 13 and 15, slots 146 preferably are elongated horizontally, or generally parallel with a plane in which frame rails 105 may lie. This allows brackets 108 to move laterally in order to accommodate differing width dimensions of frame 104 and or the size and shape of frame rails 105, as described above, without causing slots 146 to be out of alignment with apertures 126, 144 such that a fastener 112 could not pass therethrough.

Finally, as shown in FIG. 12, apron plate 106 may comprise a plurality of apertures 152 defined therein. Apertures 152 may serve as mounting locations for peripheral electronics associated with the hoist apparatus. For instance, apertures 152 may be used to mount light assemblies on the hoist apparatus, such as brake light assemblies 154 shown in FIGS. 1-2. Those of skill in the art will appreciate that other apertures may be defined in apron plate 106 in various embodiments, as needed or desired, for example to install marker lights and/or light bar bumpers and/or to allow for adjustments.

Turning now to FIGS. 17-19, as noted above securement system 100 may also comprise a pair of second brackets 110. In this regard, FIG. 17 is a perspective view of a second brackets 100. FIGS. 18-19 are respective plan and side elevation views of one of the second brackets 110. Second brackets 110 preferably provide additional points of attachment between frame 104 and sub-frame 102. In some embodiments, second brackets 110 may further provide an attachment point for linear actuators (e.g., analogous to those shown in FIGS. 1-2).

In one preferred embodiment, each second bracket 110 comprises side plate 156 and a top plate 158. Top plate 158 preferably is angled (e.g., at ninety degrees) with respect to side plate 156. In one embodiment, side plate 156 and top plate 158 of each second bracket 110 may be formed from a single metal plate or sheet that is suitably bent, but those of skill in the art will appreciate that side plate 156 and top plate 158 need not be formed from a single piece of material in all embodiments.

Side plates 156 may be generally flat members having various shapes. As shown in FIGS. 17 and 19, for example, side plates 156 are pentagonal in this embodiment, but in other embodiments side plates 156 may be rounded, rectangular, or any other suitable shape. Also, as shown in FIG. 17, where side plates 156 are not symmetrical, brackets 110 are mirror images of each other to facilitate attachment to a respective side of frame 104. Side plates 156 in this embodiment also comprise a connection surface 160 for a linear actuator, though that is not required in all embodiments. Connection surface 160, which may project from side plates 156, may define an aperture 162 that extends through side plate 156. Aperture 162 may be sized to receive a shaft or other tubing via which one end of a linear actuator may be coupled with bracket 110. Side plates 110 have an inner surface 164 configured to be disposed against frame rails 105 when sub-frame 102 is secured to frame 104.

Top plates 158 also may be generally flat members having various shapes. As shown in FIGS. 17 and 18, for example, top plates 158 are rectangular in this embodiment, though again, in other embodiments top plates 158 may comprise any other suitable shape. Top plates 158 preferably are disposed beneath and in engagement with support members 128 of sub-frame 102 and disposed above and in engagement with frame rails 105 when system 100 is assembled (see FIG. 23). In other words, in this embodiment, top plates 158 are disposed between sub-frame 102 and frame rails 105 when sub-frame 102 is secured to frame 104. In other embodiments, however, top plates 158 may be disposed above support members 128 and/or may engage with a different portion of sub-frame 102. Top plates 158 preferably define one or more slots 166. For instance, as shown, two such slots 166 are defined in each top plate 158 in this embodiment. Slots 166 are positioned on a given top plate 158 to align with slots 130 in a corresponding support member 128 of sub-frame 102 when inner surface 164 is disposed against a corresponding frame rail 105; sub-frame 102 is disposed on frame rails 105; and top plate 158 is disposed over the corresponding support member 128. In that regard, slots 166 may be elongated in a direction perpendicular to the direction in which slots 130 are elongated. The length and relative orientations of slots 130, 166 allows these slots to remain in alignment for a variety of different frame 104 dimensions. Thus, a suitable fastener 112 may be inserted in a respective pair of slots 130, 166 to attach brackets 110 to support members 128 of sub-frame 102.

As noted above, components of securement system 100 may comprise slots to account for variations in length and/or width dimensions (or other design specifications) of frames 104 and/or frame rails 105 between vehicles and vehicle manufacturers. In general, such slots (e.g., slots 130, 146, 166) may be defined to have a width sized to be equal to or just greater than the relevant dimension (e.g., diameter) of a fastener to be inserted in the slot, and a length that is greater than the fastener dimension (e.g., diameter) by some amount. Those of skill in the art can select a suitable length and width for a given slot based on expected variation in frame 104 dimensions. In one embodiment, however, the dimensions of slots 130 and slots 146 may be about $^{11}/_{16}$" diameter×1" center-center, and the dimensions of slots 166 may be about $^{11}/_{16}$" diameter×$^{3}/_{4}$" center-center. Similarly, slots 138 in apron plate 106 may have a height dimension sized to be equal to or slightly greater than the height of stems 134, and a width dimension that is greater than the width of stems 134 by some amount. Again, those of skill in the art can select a suitable length and width for slots 138 based on expected variation in frame 104 dimensions. In one embodiment, however, the dimensions of slots 138 may be about $2^{1}/_{8}$" wide×$6^{3}/_{8}$" tall. Finally, in various embodiments, slots 130, 146, 166 need not be defined as a longitudinal aperture but rather may instead be defined in other shapes, such as circular apertures, oval apertures, or others familiar to those of ordinary skill in the art.

Assembly of system 100 according to an embodiment of the present invention is described with reference to FIGS. 7 & 20-23. In this regard, FIGS. 20-21 are respective side elevation and plan views of the hoist apparatus sub-frame 102 coupled with the frame 104. FIG. 22 is a cross-sectional view taken along the line A-A in FIG. 20, and FIG. 23 is a cross-sectional view taken along the line B-B in FIG. 20.

To assemble system 100 according to an embodiment of the invention, the following steps may be performed, though not necessarily in the order described. First, two brackets 108 may each be mechanically fastened with end plate 122 and apron plate 106. In this regard, slots 146 of each bracket 108 may be placed in alignment with respective apertures 126 of end plate 122 and with respective apertures 144 of apron plate 106. Likewise, stems 134 of each bracket 108 may be passed through slots 138 of apron plate 106. Also, inner face 136 of plate 132 of each bracket 108 may be placed into engagement with apron plate 106, and outer face 150 of plate 132 of each bracket 108 may be placed into engagement with end plate 122 of sub-frame 102. (In some embodiments, intermediate elements, such as spacers or the like, could be provided between any of frame rails 105, bracket 108, apron plate 106, and/or end plate 122.) Fasteners 122, which preferably are bolts as noted above, then may be passed through apertures 126, slots 146, and apertures 144. In one preferred embodiment, nuts may be provided to retain fasteners 122 in place but may not be fully tightened at this time. Also, although brackets 108 are shown as being disposed between apron plate 106 and end plate 122 in this embodiment, in other embodiments end plate 122 may be disposed between apron plate 106 and brackets 108. In the latter such embodiments, end plate 122 may have appropriate slots defined therein, for example analogous to slots 138.

With reference to FIG. 22 in particular, sub-frame 102 may be placed on frame rails 105 such that the longitudinal axis of sub-frame 102 is generally parallel with the longitudinal axis of frame rails 105. Sub-frame 102 may be moved or adjusted lengthwise along frame rails 105 until apron plate 106 is in engagement with the end faces of each frame rail 105. At this point, each stem 134 of each bracket 108 may extend along a plane that is parallel with the longitudinal axis of frame rails 105. However, because the widths of various vehicle frames may vary, as explained above, stems 134 of each bracket 108 initially may not be in engagement with a respective frame rail 105, but rather may be spaced laterally therefrom by some distance. Accordingly, the respective positions of brackets 108 may need to be adjusted laterally relative to each frame rail 105 and with respect to apron plate 106 and end plate 122 of sub-frame 102. If fasteners 122 are not fully tightened, and by virtue of slots 146, brackets 108 may be moved laterally until each stem 134 engages a respective frame rail 105. (In the illustrated embodiment, stems 134 are shown in engagement with an internal face of frame rails 105, but it will be appreciated that in other embodiments, stems 134 could be in engagement with an external face of frame rails 105.) At this point, the positions where apertures 142 will need to be provided in frame rails 105 so that fasteners 112 may extend through frame rails 105 and apertures 140 in stems 134 may be marked, and such apertures 142 may be defined (e.g., drilled) in each frame rail 105. (As noted above, in some embodiments, apertures 140 may not be pre-defined in stems 134, and instead apertures 140, 142 could be defined at substantially the same time.) Fasteners 112, such as bolts, may then be passed through apertures 142 and 140, and loosely secured in place, for example by providing nuts or the like thereon. Again, fasteners 112 may not be fully tightened at this time.

Similarly, two brackets 110 may be coupled with a respective frame rail 105 and with a respective support member 128 of sub-frame 102. In this regard, and with reference to FIG. 23 in particular, each top plate 158 may be disposed above a respective frame rail 105 and below a respective support member 128 and positioned such that slots 166 are generally aligned with corresponding slots 130 in support members 128. Fasteners 112 may then be passed through slots 130, 166 and secured with nuts or the like, though again the nuts may not be fully tightened at this time. As explained above, due to variations in the widths of frame rails 105 on various vehicles, side plates 156 of each bracket 110 initially may not be in engagement with a respective frame rail 105. Accordingly, the respective positions of brackets 110 may need to be adjusted laterally relative to each frame rail 105. Again if fasteners 112 are not fully tightened, and by virtue of slots 166, 130, brackets 110 may be moved laterally until each side plate 156 engages a respective frame rail 105. (In some embodiments, intermediate elements, such as spacers or the like, could be provided between any of brackets 110, frame rails 105, and/or support members 128.) Apertures 168 then may be defined (e.g., drilled) in each side plate 156, and corresponding aligned apertures 170 may be defined (e.g., drilled) in each frame rail 105. In various embodiments, apertures 168 and 170 may either be pre-defined or drilled at substantially the same time. Fasteners 112, such as bolts, may then be passed through apertures 168 and 170, and secured in place, for example by providing nuts or the like thereon. At this point, all other fasteners 112 that have not yet been fully tightened may be fully tightened. Thus, sub-frame 102 may be secured to frame rails 105.

In various embodiments, and depending on the type of hoist apparatus involved, linear actuators may then be provided. For instance, if the hoist apparatus is a cable hoist as described above, a length of tubing may be provided through apertures 162 in side plates 156, and one end of a respective linear actuator may be coupled with each end of the length of tubing. The main frame of the cable hoist may then be pivotably coupled with sub-frame 102, and the other end of each respective linear actuator may then be coupled with suitable attachment points on the main frame. Of course, as noted above, in various embodiments, the hoist apparatus may be a hook hoist, loaded container handler, or any other suitable hoist apparatus, and such linear actuators may not be provided in all embodiments.

As noted above, many other securement system embodiments are contemplated and within the scope of the invention. Referring now to FIGS. 24-25, for example, a system 200 for securing a hoist apparatus sub-frame 202 to a vehicle frame in accordance with another embodiment of the present invention is illustrated. In this regard, FIG. 24 is a perspective view of system 200. FIG. 25 is an exploded perspective view of system 200. In this embodiment, the hoist apparatus having sub-frame 202 may also be a cable hoist, and sub-frame 202 may be analogous to sub-frame 16 of hoist apparatus 10 discussed above with reference to FIGS. 1-2. Sub-frame 202 may also be similar in many respects to sub-frame 102 discussed in detail above, and thus only certain differences between sub-frames 102, 202 are explained below.

As shown in FIGS. 24-25, in this embodiment, sub-frame 202 may comprise an apron plate 204, rather than apron plate 204 being a separate component. Also, an end-plate 206 may be separately coupled with sub-frame 202 during installation, rather than being part of sub-frame 202. More particularly, in this embodiment apron plate 204 is generally rectangular in shape, but defines an angled cut-out portion 208 to allow for clearance of cables 210 used with the hoist apparatus. End plate 206 similarly is generally rectangular in shape but also defines an angled cut out portion 212. Sub-frame 202 may comprise two longitudinal sub-frame rails 214, and apron plate 204 may depend from sub-frame rails 214. In this embodiment, apron plate 204 may extend along a plane that is perpendicular to a plane in which sub-frame rails 214 lie.

System 200 in this embodiment also comprises brackets 216, which generally may be analogous to brackets 108 described above. In this embodiment, however, the plates 218 of brackets 216 may be modified as shown to have a shape the outline of which corresponds to the cutout portions 208, 210 of apron plate 204 and end-plate 206 when system 200 is assembled. It will also be appreciated that plates 218 of brackets 216 may have other shapes in other embodiments.

In this embodiment, end plate 206 may be coupled with brackets 216 and apron plate 204 of sub-frame 202 via suitable fasteners 220. Fasteners 220 may be analogous to fasteners 112 described above. As with apron plate 106 above, apron plate 204 in this embodiment defines slots 220 therein to receive stems of brackets 216. Likewise, brackets 218 in this embodiment preferably define a plurality of slots that correspond to apertures defined in apron plate 204 and end plate 206, through which fasteners 220 may pass to couple end plate 206, brackets 218, and apron plate 204 together. Accordingly, and as with system 100 described above, in system 200 brackets 218 may be adjusted laterally relative to apron plate 204 and end plate 206 to accommodate various width vehicle frames.

FIG. 26 is a perspective view of a hoist apparatus sub-frame 300 of a hoist apparatus according to an embodiment of the invention. Sub-frame 300 preferably is analogous in some respects to sub-frame 102 described in detail above, and like parts are indicated with like reference numerals. In various embodiments of the invention, where slots or apertures are provided, any number of such slots or apertures may be provided as needed or desired to accommodate a variety of different vehicle dimensions. Thus, in the illustrated embodiment, four apertures 130 are defined in each support member 128. Additionally, in this embodiment, sub-frame 300 comprises a pair of support members 302 disposed at front end 116 and which extend generally parallel with rails 114. Support members 302, which may comprise a generally elongate, flat metal strip, project laterally outwardly from rails 114 in this embodiment. Support members 302 may be used as mounting brackets for a variety of components, such as a valve assembly 304 associated with a vehicle's hydraulic system and/or a hydraulic oil tank 306 (see FIGS. 30-31).

FIG. 27 is a perspective view of an apron assembly 308 according to an embodiment of the invention. Apron assembly 308 comprises an apron plate 310 that is preferably analogous in some respects to apron plate 106 described in detail above, and thus like parts are indicated with like reference numerals. In this embodiment, apron assembly 308 comprises a pair of tabs 312. Tabs 312, which are preferably welded or otherwise suitably attached to apron plate 310 along an upper edge 314 thereof, project from apron plate 310 along a plane that is generally perpendicular with a plane on which apron plate 310 lies. Tabs 312 may be at the same height as upper edge 314 or may be above or below than upper edge 314 in various embodiments. In this embodiment, apron plate 310 may also define a pair of apertures 316 to allow passage of wiring, e.g., associated with light bars that may be coupled with apron plate 310.

As those of skill in the art will appreciate, tabs 312 may facilitate installation of a securement system in some embodiments. In this regard, tabs 312 preferably are spaced along upper edge 314 such that they may rest on each frame rail during and after apron assembly 308 is installed on a vehicle frame. Tabs 312 thus may serve to locate apron plate 310 and to hold it in place relative to the vehicle frame while the other components of the securement system are installed.

FIG. 28 is a perspective view of a first bracket 318 in accordance with an embodiment of the invention. First bracket 318 preferably is analogous in some respects to one of first brackets 108 described in detail above, and thus like parts are indicated with like reference numerals. As noted above, in some embodiments, first brackets 108 may not have pre-defined apertures 140, and such apertures 140 may be drilled simultaneously with apertures in the frame rails during installation. Thus, as shown in FIG. 28, first bracket 318 comprises a "blank" stem 134 in which no apertures are pre-defined.

FIG. 29 is a perspective view of a pair of second brackets 320 in accordance with an embodiment of the invention. Second brackets 320 preferably are analogous in some respects to second brackets 110 described in detail above, and thus like parts are indicated with like reference numerals. As with other components of securement assemblies in various embodiments, the second brackets may be modified in various ways to accommodate varying dimensions between vehicles. Thus, for example, in the illustrated embodiment second brackets 320 comprise side plates 156 that are rounded. Here, side plates 156 comprise an indented portion 322 that may better fit certain vehicle frames. Also, top plates 158 in this embodiment may each define four slots 166 to accommodate various vehicle frames. Further, the interior, or frame-facing, faces of side plates 156 of each second bracket 320 may comprise a tab 324 projecting therefrom. Tabs 324 may be used to facilitate installation of a shaft that extends between second brackets 320. As a final example, second brackets 320 may each comprise a hoist prop 326 coupled therewith. Hoist props 326 preferably comprise prop bars 328 pivotably coupled with side plates 156 via a mounting bracket 330. Those of skill in the art are familiar with hoist props and other similar hoist apparatus safety devices. Typically, such devices may be welded to the vehicle frame or another component during installation of the hoist apparatus. However, providing hoist props 326 on second brackets 320 in this embodiment ensures that an operator or installer does not have to perform any welding, even with respect to safety devices, during installation of a hoist device using this securement system.

FIGS. 30-31 are perspective and rear elevation views of a hoist apparatus 350 coupled with a frame 352 of a vehicle 354 according to an embodiment of the invention. For the sake of clarity, the vehicle is only partially illustrated in these figures. Vehicle 354 as shown is used with the subframe 300 of FIG. 26, the apron plate 310 of FIG. 27, the first brackets 318 of FIG. 28, and the second brackets 320 of FIG. 29. In some respects, vehicle 354 is analogous to the vehicle shown in FIGS. 1-2, and thus other like parts are indicated by like reference numerals.

Based on the foregoing, it will be appreciated that embodiments of the invention provide improved systems and methods for securing a hoist apparatus to a vehicle frame. Indeed, in the past, hoist apparatuses used for lifting and transporting waste containers weighing thousands of pounds were secured to vehicle frames at least in part by welding, if not also using other means. It was believed that welding was necessary for the hoist apparatuses to be adequately secured to the vehicle frame while handling such heavy containers. However, embodiments of the present invention, which do not require welding, may be used in not only "typical duty" applications (e.g., those involving containers weighing up to 30,000 lbs), but also heavy duty applications, including those that require loading, unloading, transporting, and emptying containers weighing up to 75,000 lbs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A hoist apparatus assembly for a vehicle, the vehicle comprising a vehicle frame comprising first and second longitudinal rails, the hoist apparatus assembly comprising:
   a hoist apparatus mechanically fastened to and detachable from the vehicle frame, the hoist apparatus comprising a hoist apparatus frame;
   at least one first bracket, the at least one first bracket comprising a plate and a stem coupled with the plate, wherein the plate and the stem are each planar in shape and disposed at a right angle to one another, and wherein a plurality of slots are defined in the plate;
   a plurality of first mechanical fasteners, each first mechanical fastener extending through a respective slot defined in the plate of the at least one first bracket to fasten the at least one first bracket and the hoist apparatus frame to one another; and
   at least one second mechanical fastener extending between the stem of the at least one first bracket and the first longitudinal rail of the vehicle frame and securing the stem and the first longitudinal rail to one another.

2. The hoist apparatus assembly of claim 1, wherein the stem of the at least one first bracket extends along a plane parallel with a longitudinal axis of the first longitudinal rail.

3. The hoist apparatus assembly of claim 1, further comprising at least one second bracket comprising a side plate and a top plate disposed at an angle to the side plate, wherein the top plate of the at least one second bracket is mechanically fastened to the hoist apparatus frame and wherein the side plate of the at least one second bracket is mechanically fastened to the first longitudinal rail.

4. The hoist apparatus assembly of claim 3, wherein the side plate of the at least one second bracket extends along a plane parallel with the longitudinal axis of the first longitudinal rail.

5. The hoist apparatus assembly of claim 3, wherein the top plate of the at least one second bracket is disposed between the first longitudinal rail and the hoist apparatus frame.

6. The hoist apparatus assembly of claim 3, further comprising a plurality of slots defined in the top plate of the at least one second bracket through which mechanical fasteners extend to fasten the at least one second bracket to the hoist apparatus frame.

7. The hoist apparatus assembly of claim 3, further comprising two first brackets, wherein each first bracket is mechanically fastened to the hoist apparatus frame and wherein one of the first brackets is mechanically fastened to the first longitudinal rail and the other of the first brackets is mechanically fastened to the second longitudinal rail.

8. The hoist apparatus assembly of claim 7, further comprising two second brackets, wherein each second bracket is mechanically fastened to the hoist apparatus frame and wherein one of the second brackets is mechanically fastened to the first longitudinal rail and the other of the second brackets is mechanically fastened to the second longitudinal rail.

9. The hoist apparatus assembly of claim 1, further comprising an apron plate defining at least one slot therethrough, wherein the stem of the at least one first bracket extends through the at least one slot.

10. The hoist apparatus assembly of claim 1, wherein the vehicle is a trailer.

11. The hoist apparatus assembly of claim 1, wherein the hoist apparatus is a loaded container handler.

12. A hoist apparatus assembly for a vehicle, the vehicle comprising a vehicle frame, the hoist apparatus assembly comprising:
  a hoist apparatus comprising a hoist apparatus frame, the hoist apparatus frame comprising a first end, a second end opposite the first end, and a longitudinal axis;
  an apron plate disposed at the hoist apparatus frame first end, the apron plate being planar in shape and defining at least one slot therethrough; and
  at least one first bracket comprising a plate and a planar stem projecting from the plate, wherein a plurality of slots are defined in the plate, and wherein the stem is disposed at a right angle to the plate;
  wherein the plate of the at least one first bracket is fastened with the hoist apparatus frame at the hoist apparatus frame first end via a plurality of mechanical fasteners respectively extending through the plurality of slots defined in the plate;
  wherein the stem of the at least one first bracket extends through the at least one slot in the apron plate for attachment with the vehicle frame.

13. The hoist apparatus assembly of claim 12, wherein the stem of the at least one first bracket extends along a plane parallel with the hoist assembly frame longitudinal axis.

14. The hoist apparatus assembly of claim 12, wherein the hoist apparatus frame comprises an end plate at the hoist apparatus frame first end and the plate of the at least one first bracket is coupled with the end plate.

15. The hoist apparatus assembly of claim 14, wherein a first side of the plate of the at least one first bracket is in engagement with the apron plate, and wherein a second side of the plate of the at least one first bracket is in engagement with the end plate of the hoist apparatus frame.

16. The hoist apparatus assembly of claim 12, wherein the hoist apparatus frame is not welded to the vehicle frame.

17. The hoist apparatus assembly of claim 12, further comprising at least one second bracket, the at least one second bracket comprising a side plate and a top plate disposed at a right angle to the side plate, wherein the side plate of the at least one second bracket is coupled with the vehicle frame and wherein the top plate of the at least one second bracket is coupled with the hoist apparatus assembly.

18. The hoist apparatus assembly of claim 17, further comprising a plurality of slots defined in the top plate of the at least one second bracket.

19. The hoist apparatus assembly of claim 18, wherein bolts extend through the slots defined in the plate of the at least one first bracket and the slots defined in the top plate of the at least one second bracket to fasten the at least one first bracket and the at least one second bracket to the hoist apparatus frame.

20. The hoist apparatus assembly of claim 12, wherein the hoist apparatus is a hook hoist.

21. A method for attaching a hoist apparatus to a vehicle frame, the hoist apparatus comprising a hoist apparatus frame and the vehicle frame comprising first and second longitudinal rails, the vehicle frame having a proximal end and a distal end, the vehicle frame having a first longitudinal axis, and the hoist apparatus having a second longitudinal axis, the method comprising the steps of:
  placing the hoist apparatus frame on the first and second longitudinal rails such that the first longitudinal axis is parallel with the second longitudinal axis;
  positioning a planar apron plate at the distal end of the vehicle frame, the apron plate defining at least one slot therein;
  providing at least one first bracket comprising a plate and a stem projecting from the plate, wherein a plurality of slots are defined in the plate, and wherein the stem is disposed at a right angle to the plate;
  positioning the stem of the at least one first bracket so that it passes through the at least one slot defined in the apron plate and is in engagement with the first longitudinal rail;
  positioning the plate of the at least one first bracket so that it engages the hoist apparatus frame;
  mechanically fastening the stem of the at least one first bracket with the first longitudinal rail; and
  mechanically fastening the plate of the at least one first bracket with the hoist apparatus frame via a plurality of mechanical fasteners that respectively extend through the plurality of slots defined in the plate.

22. The method of claim 21, further comprising the step of providing at least one second bracket, the at least one second bracket comprising a side plate and a top plate disposed at a right angle to the side plate.

23. The method of claim 22, further comprising the steps of mechanically fastening the side plate of the at least one second bracket with the first longitudinal rail and the top plate of the at least one second bracket with the hoist apparatus frame.

24. The method of claim 23, wherein the hoist apparatus is a cable hoist, the cable hoist having a main frame pivotably coupled with the hoist apparatus frame.

25. The method of claim 24, further comprising the steps of providing a hydraulic cylinder having a first end and a second end, coupling the hydraulic cylinder first end with the side plate of the at least one second bracket, and coupling the hydraulic cylinder second end with the cable hoist main frame.

\* \* \* \* \*